(12) United States Patent
Singh et al.

(10) Patent No.: US 11,227,454 B2
(45) Date of Patent: Jan. 18, 2022

(54) SMART LOCK SYSTEM

(71) Applicant: Altro Smart, Inc., Milpitas, CA (US)

(72) Inventors: Harmeet Singh, Dubai (AE); Anand Choudha, Dubai (AE); Nayna Choudha, Pune (IN); Jitendra Singh Phalswal, Pune (IN)

(73) Assignee: Altro Smart Inc., Milpitas, CA (US)

( * ) Notice: Subject to any disclaimer, the term of this patent is extended or adjusted under 35 U.S.C. 154(b) by 0 days.

(21) Appl. No.: 16/705,932

(22) Filed: Dec. 6, 2019

(65) Prior Publication Data

US 2020/0372738 A1 Nov. 26, 2020

(30) Foreign Application Priority Data

May 20, 2019 (IN) .............................. 201911019923

(51) Int. Cl.
*G07C 9/00* (2020.01)
*H04N 7/18* (2006.01)
*H04N 7/14* (2006.01)

(52) U.S. Cl.
CPC ..... *G07C 9/00571* (2013.01); *G07C 9/00309* (2013.01); *G07C 9/00674* (2013.01); *H04N 7/147* (2013.01); *H04N 7/186* (2013.01); *H04N 7/188* (2013.01)

(58) Field of Classification Search
CPC ............ G07C 9/00571; G07C 9/00309; G07C 9/00674; G07C 2009/00365; G07C 9/00817; G07C 2009/00825; G07C 2009/00841; G07C 9/23; G07C 9/33; G07C 2209/08; G07C 2209/63; G07C 2209/64; G07C 2209/62; H04N 7/147; H04N 7/186; H04N 7/188; E05B 2047/002; E05B 2047/0028; E05B 2047/0069; E05B 2047/0054; E05B 47/06; E05B 47/0615

USPC ................. 340/5.61, 5.7; 70/279.1, 280, 472
See application file for complete search history.

(56) References Cited

U.S. PATENT DOCUMENTS

| | | | |
|---|---|---|---|
| 9,648,290 B2 | 5/2017 | Carter | |
| 10,097,797 B2 | 10/2018 | Carter | |
| 2005/0285934 A1* | 12/2005 | Carter | H04N 7/142 348/14.06 |
| 2006/0170533 A1* | 8/2006 | Chioiu | G07C 9/27 340/5.61 |
| 2007/0290789 A1* | 12/2007 | Segev | E05B 47/0657 340/5.6 |

(Continued)

*Primary Examiner* — Edwin C Holloway, III
(74) *Attorney, Agent, or Firm* — Blank Rome LLP

(57) ABSTRACT

A smart lock system that includes a smart lock that electronically locks and unlocks a door and a server that outputs a command to the smart lock to lock or unlock the door via the internet in response to an instruction received via the internet from a user device. The user device may also (simultaneously) directly transmit an instruction to the smart lock (e.g., via Bluetooth). The user device may also directly transmit an instruction to the smart lock to unlock the door in response to a determination that the user device is within a predefined geofenced region around the smart lock. The smart lock may also include a keypad. The smart lock may also include a camera that captures images and output those images to the server for transmittal to the user device. The smart may also include a motion sensor and capture images in response to detected motion.

20 Claims, 14 Drawing Sheets

(56) References Cited

U.S. PATENT DOCUMENTS

| | | | | |
|---|---|---|---|---|
| 2012/0280783 A1* | 11/2012 | Gerhardt | ............ | G07C 9/00571 340/5.6 |
| 2013/0342314 A1* | 12/2013 | Chen | ................. | G07C 9/00309 340/5.65 |
| 2014/0265359 A1* | 9/2014 | Cheng | ................... | E05B 47/026 292/144 |
| 2015/0319411 A1* | 11/2015 | Kasmir | ................. | H04N 7/188 348/143 |
| 2015/0371469 A1* | 12/2015 | Scalisi | ............... | G07C 9/00563 340/5.52 |

* cited by examiner

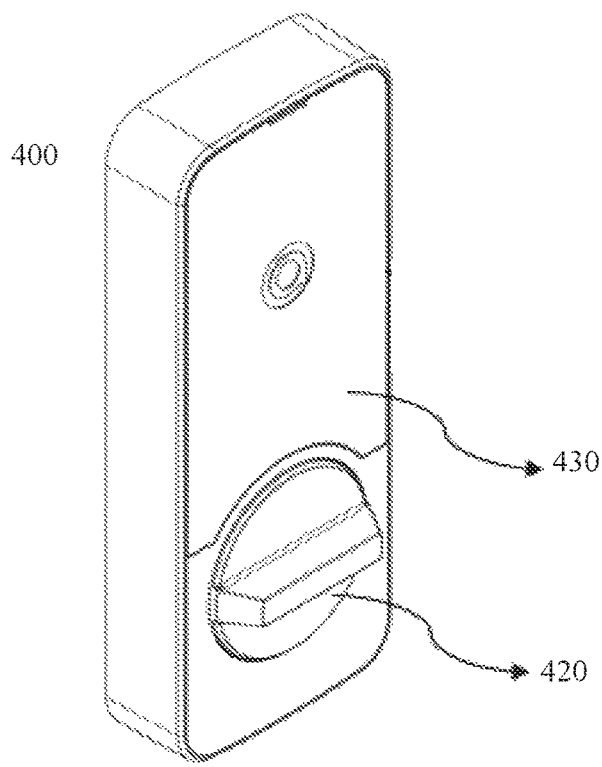
Figure 4A
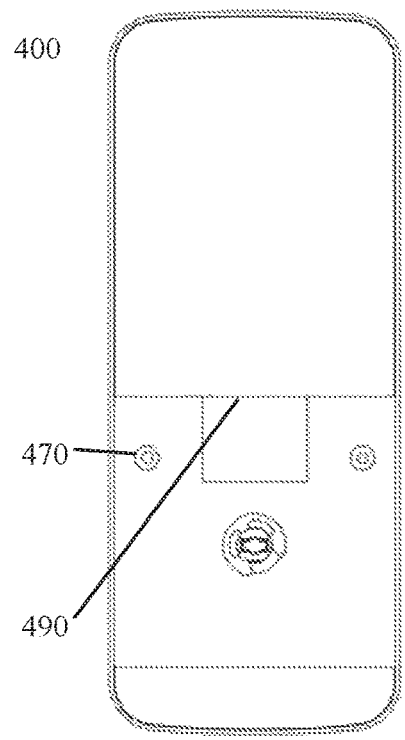 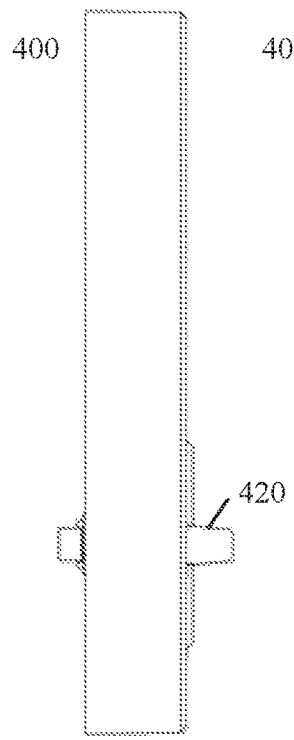 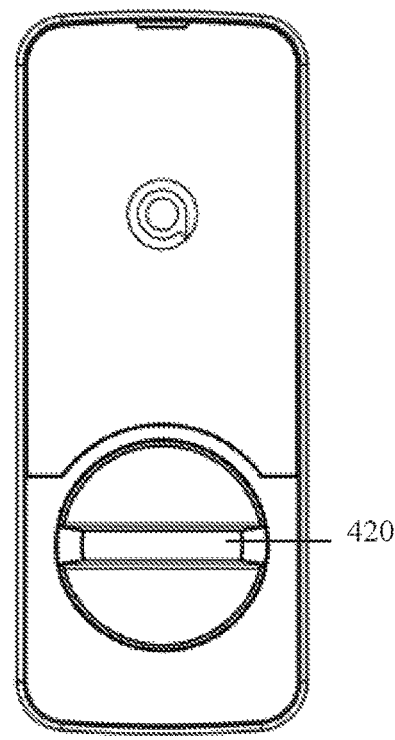
Figure 4B    Figure 4C    Figure 4D Inner Unit

SMART LOCK SYSTEM

CROSS-REFERENCE TO RELATED APPLICATIONS

This application claims priority to Indian Provisional Application No. 201911019923, filed May 20, 2019, which is hereby incorporated by reference.

BACKGROUND

U.S. Pat. Nos. 10,097,797 and 9,648,290 show a video doorbell having a camera that captures images of an individual ringing the doorbell and transmits those images to a user device (e.g., a smartphone). Those prior art video doorbells may also capture video in response to motion detected by a motion sensor. However, those prior art video doorbells do not provide functionality for a user remotely viewing a visitor to remotely unlock the door.

Meanwhile, some prior art electronic locks include a keypad and electronically unlock the door in response to a predefined code entered on the keypad (e.g., the Rim Lock YDR3110 from Yale, the Handle Type Mortise Lock SHS-H505 from Samsung, etc.) However, those prior art electronic locks do not provide an easy-to-use interface for the user to set or change the code that enables the door to be unlocked. Furthermore, those prior art electronic locks do not provide functionality for users to create codes for guests that provide temporary, time limited, or revocable access via the keypad.

In addition, some prior systems (particularly automobiles) provide keyless entry to individuals carrying a device within range of the door. However, those prior art keyless entry systems are generally triggered by the presence of a specialized (often single-purpose) hardware device, such as a fob or a car key. Therefore, those prior art keyless entry systems require the distribution of specialized hardware devices. If the prior art keyless entry system is triggered by the presence of an active transmitter, then those specialized hardware devices require maintenance, including new batteries.

Therefore, there is a need for a video doorbell that includes functionality for a user remotely viewing a visitor to remotely unlock the door. Furthermore, there is a need for an electronic lock with a keypad that provides an easy-to-use interface easy-to-use interface for the user to set or change preset code that enables the door to be unlocked—preferably including functionality for users to create codes for guests that provide temporary, time limited, or revocable access via the keypad. Finally, there is a need for an electronic lock that provides keyless entry without requiring the distribution of specialized hardware devices.

SUMMARY

A smart lock system is provided that includes a smart lock which electronically locks and unlocks a door and a server that outputs a command to the smart lock to lock or unlock the door via the internet in response to an instruction received via the internet from a user device. The user device may also directly transmit an instruction (e.g., via Bluetooth) to the smart lock to lock or unlock the door (e.g., simultaneously with the instruction to the server via the internet). The smart lock system may also provide keyless entry by providing functionality for the user device to directly transmit an instruction to the smart lock to unlock the door without user interaction in response to a determination that the user device is within a predefined geofenced region around the smart lock. The smart lock may also include a keypad and the server may provide functionality for the user to preset a digital key to unlock the smart lock via the keypad. The server may provide functionality for the user to set the digital key via the user device. The smart lock may also include a camera that captures images and may output those images to the server for transmittal to the user device. The smart may also include a motion sensor and may capture images in response to detected motion.

BRIEF DESCRIPTION OF THE DRAWINGS

FIG. 4A is a diagram of an inner unit of the smart lock according to an exemplary embodiment of the present invention.

FIG. 4B is another view of the inner unit of the smart lock according to an exemplary embodiment of the present invention.

FIG. 4C is another view of the inner unit of the smart lock according to an exemplary embodiment of the present invention.

FIG. 4D is another view of the inner unit of the smart lock according to an exemplary embodiment of the present invention.

DETAILED DESCRIPTION

Figure 1:
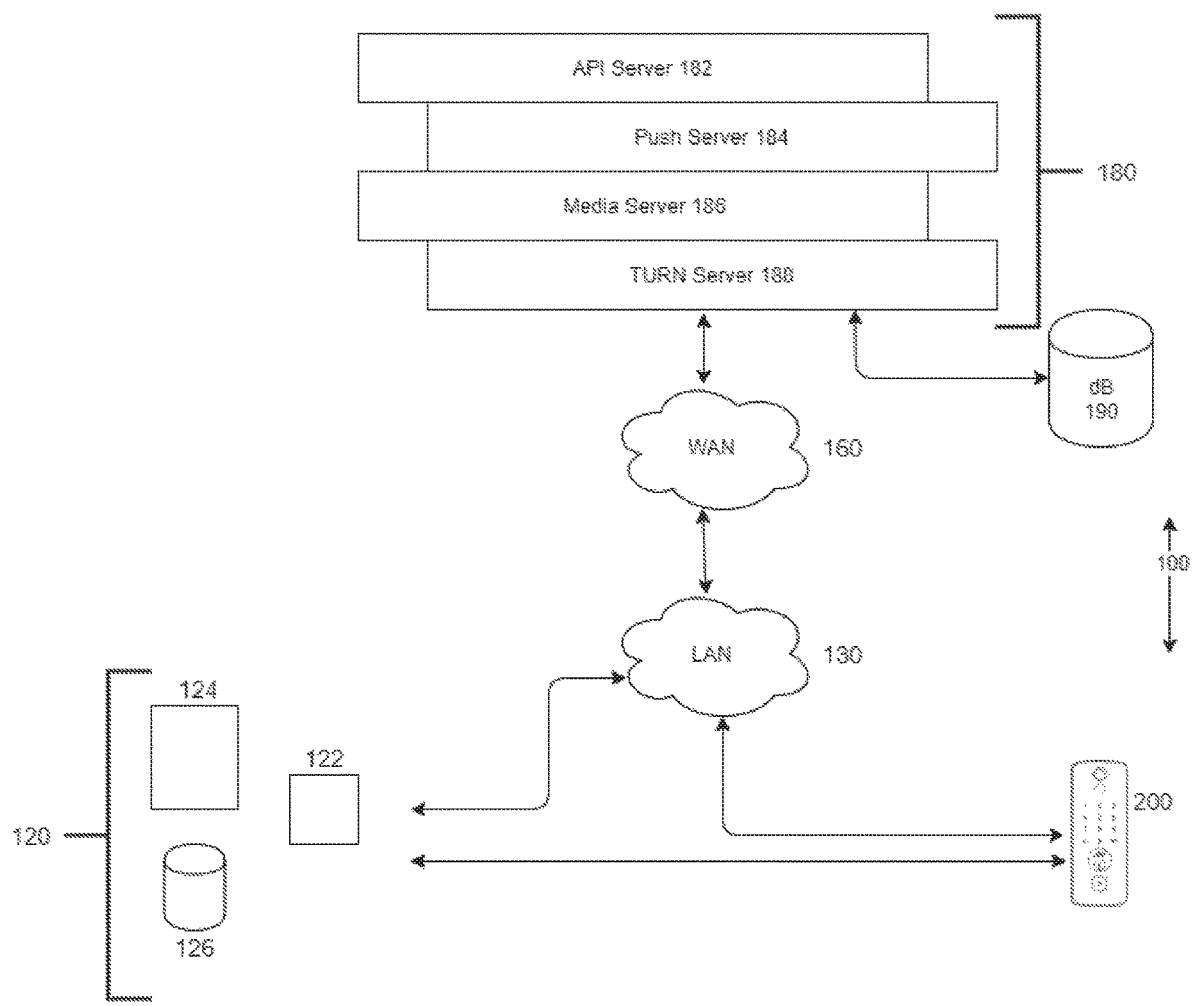
FIG. 1 is a diagram of a smart lock system according to an exemplary embodiment of the present invention.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

FIG. 1 shows a diagram of a smart lock system 100 according to an exemplary embodiment of the present invention. The smart lock system 100 includes a smart lock apparatus 200 and remote server(s) 180. The smart lock 200 and the remote servers 180 bidirectionally communicate via a local area network 130 (e.g., an in-home WiFi network) and a wide area network 160 (e.g., the internet). The smart lock 200 also bidirectionally communicates with user devices 120 (for example, user smart phones 122, user tablets 124, and smart home devices 126 such as personal computers) via the local area network 130 and directly using short range, wireless communication (e.g., Bluetooth Low Energy). The remote servers 180 also bidirectionally communicate with the user devices 120 via the local area network 130 and the wide area network 160. The remote server(s) 180 communicate with a remote database 190 either directly (e.g., through a wired connection) or indirectly via a remote computing network.

The remote server(s) 180 may include any hardware computing device capable of carrying out the instructions such that the remote server(s) 180 perform the functions described herein. For example, the remote server(s) 180 may include an application programming interface (API) server 182, a push server 184, a media server 186, and a traversal using relays around NAT (TURN) server 188. The API server 182 may be any hardware computing device that provides an endpoint for the user devices 120 to communicate with the remote server(s) 180 via the wide area network 160. The push server 184 may be any hardware computing device capable of transmitting information and/or instructions to the user devices 120 and/or the smart lock 200 via the wide area network 160. The media server 186 may be any hardware computing device capable of transmitting media (e.g., audio and/or video received from the smart lock 200) to the user devices 120 via the wide area network 160. And the TURN server 188 may be any hardware computing device that assists in the traversal of network address translators (NAT) or firewalls for multimedia applications. The API server 182, the push server 184, the media server 186, and/or the TURN server 188 may be realized as separate computing devices that communicate via a remote computing network or some or all of those functions may be performed by a single hardware computing device. The remote database 190 may be stored on any non-transitory computer-readable storage medium capable of storing the data necessary for the remote server(s) 180 to perform the functions described herein.

Figure 2A:
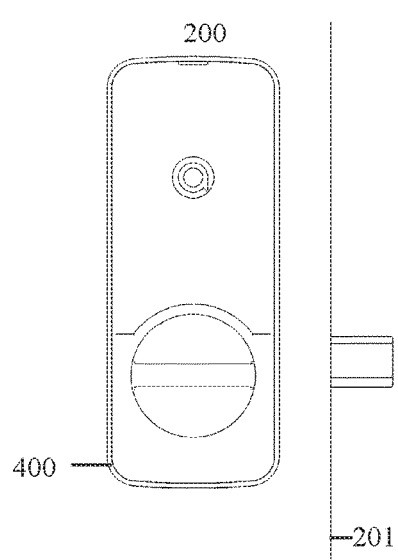
FIG. 2A is a diagram of a smart lock installed on a door according to an exemplary embodiment of the present invention.
Figure 2B:
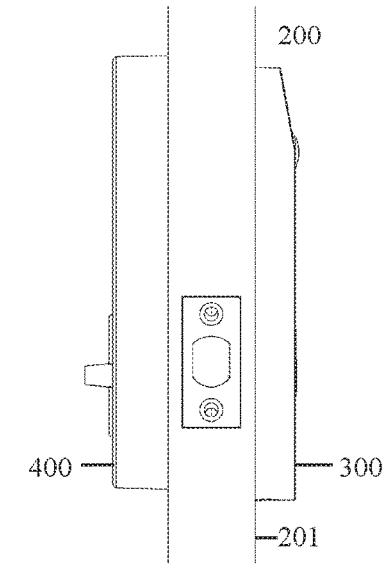
FIG. 2B is another view of the smart lock installed on the door according to an exemplary embodiment of the present invention.
Figure 2C:
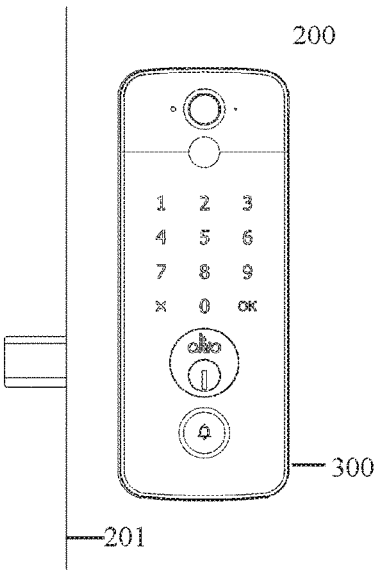
FIG. 2C is another view of the smart lock installed on the door according to an exemplary embodiment of the present invention.

FIGS. 2A-2C are diagrams of the smart lock apparatus 200 installed on a door 201 according to an exemplary embodiment of the present invention. The smart lock 200 includes an inner unit 400 for installation on the inside of the door 201 and an outer unit 300 for installation on the outside of the door 201.

Figure 3A:
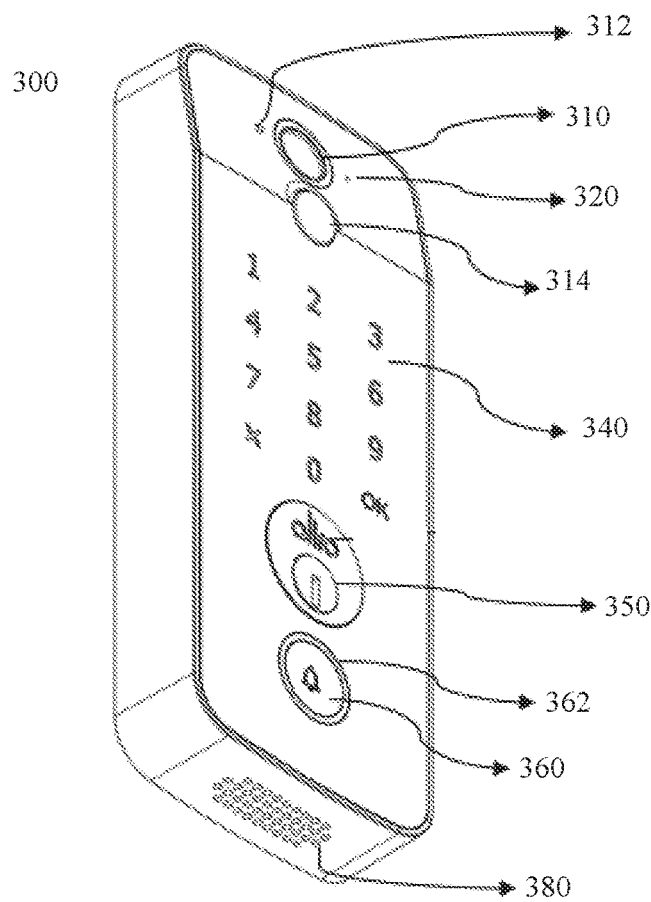
FIG. 3A is a diagram of an outer unit of the smart lock according to an exemplary embodiment of the present invention.

FIGS. 3A-3D are diagrams of the outer unit 300 of the smart lock 200 according to an exemplary embodiment of the present invention. As shown in FIG. 3A, the outer unit 300 of the smart lock 200 includes an imaging device such as a camera 310, an audio device such as a microphone 320, a keypad 340, a key hole 350, a lock/ring button 360, and a speaker 380. The outer unit 300 may also include an ambient light sensor 312, a motion sensor 314 for use with the camera 310 and/or a ring button light 362 for illuminating the lock/ring button 360.

The camera 310 may be any optical instrument capable of capturing and recording images. For example, the camera 310 may be a 1080p complementary metal-oxide-semiconductor (CMOS) sensor. The ambient light sensor 312 may be any photodetector capable of sensing the amount of ambient light present in the environment surrounding the outer unit 300. The motion sensor 314 may be any device capable of detecting moving objects, such as people. For example, the motion sensor 314 may be a passive infrared sensor (PIR). The microphone 320 may be any device (e.g., a transducer) that converts sound into an electrical signal and stores and/or transmits information indicative of that electrical signal. For example, the microphone 320 may be a microelectromechanical system (MEMS). The keypad 340 may be any input device that provides functionality for users to input a code. For example, the keypad 340 may be a 12-key touchpad with touch-sensitive regions corresponding to each of the numbers 0-9 that enable a user to input a numeric code. They keypad 340 may detect user input at the touch-sensitive regions through capacitive sensing, resistive sensing, etc. The key hole 350 may be any opening that allows a user to insert a (matching) physical key, which may be used to manually unlock the smart lock 200. The lock/ring button 360 may be any switch mechanism that allows users to initiate a process by pressing the lock/ring button 360. The ring button light 362 may be any device capable of producing visible light (e.g., a light emitting diode) to illuminate the lock/ring button 360. The speaker 380 may be any device (e.g., an electroacoustic transducer) capable of converting an electrical audio signal into a corresponding sound.

Figure 3B:
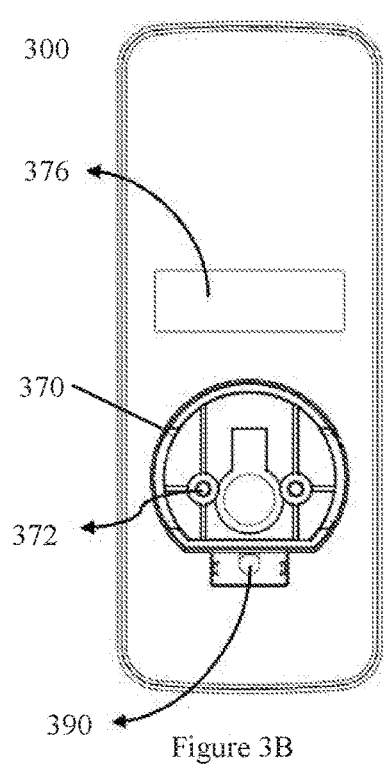
FIG. 3B is another view of the outer unit of the smart lock according to an exemplary embodiment of the present invention.

FIG. 3B is a back or rear view of the outer unit 300 of the smart lock 200 according to an exemplary embodiment of the present invention. The back side of the outer unit 300 includes a mounting bracket 370 with mounting holes 372 for installation on a door 201. The back side of the outer unit 300 also includes an interconnect cable 390 to bidirectionally transmit data to the inner unit 400 and receive power from the inner unit 400. The back side of the outer unit 300 may also include an information label 376. When properly installed on a door 201, the back side of the outer unit 300 (and the information label 376) abuts the door 201 and is therefore not visible.

Figure 3C:
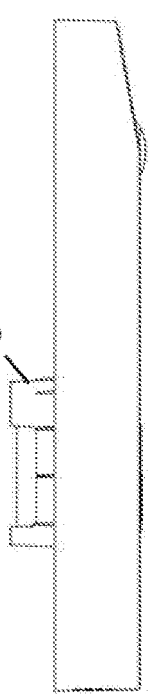
FIG. 3C is another view of the outer unit of the smart lock according to an exemplary embodiment of the present invention.
Figure 3D:
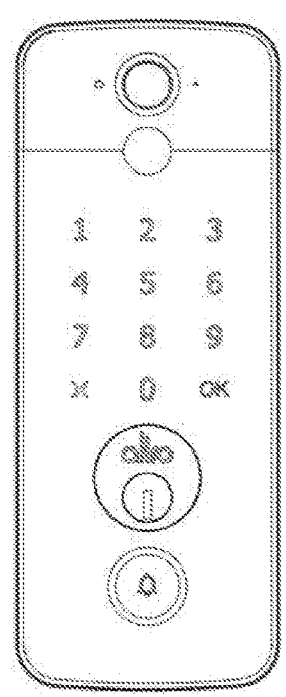
FIG. 3D is another view of the outer unit of the smart lock according to an exemplary embodiment of the present invention.

FIG. 3C is a side view of the outer unit 300 of the smart lock 200 according to an exemplary embodiment of the present invention. FIG. 3D is a front view of the outer unit 300 of the smart lock 200 according to an exemplary embodiment of the present invention.

FIGS. 4A-4D are diagrams of the inner unit 400 of the smart lock 200 according to an exemplary embodiment of the present invention. As shown in FIG. 4A, the inner unit 400 of the smart lock 200 includes manual knob 420 and a battery door 430. The manual knob 420 provides functionality for the user to lock and unlock the door 201. The battery door 430 secures the battery pack inside the smart lock 200.

FIG. 4B is a back view of the inner unit 400 of the smart lock 200 according to an exemplary embodiment of the present invention. The inner unit 400 of the smart lock 200 includes an interconnect port 490 that mates with the interconnect cable 390 of the outer unit 300 to bidirectionally transmit data to the outer unit 300 and supply power to the outer unit 300. When properly installed on a door 201, the back side of the inner unit 400 abuts the door 201 and is therefore not visible. FIG. 4C is a side view of the inner unit 400 of the smart lock 200 according to an exemplary embodiment of the present invention. FIG. 4D is a front view of the inner unit 400 of the smart lock 200 according to an exemplary embodiment of the present invention.

Figure 5A:
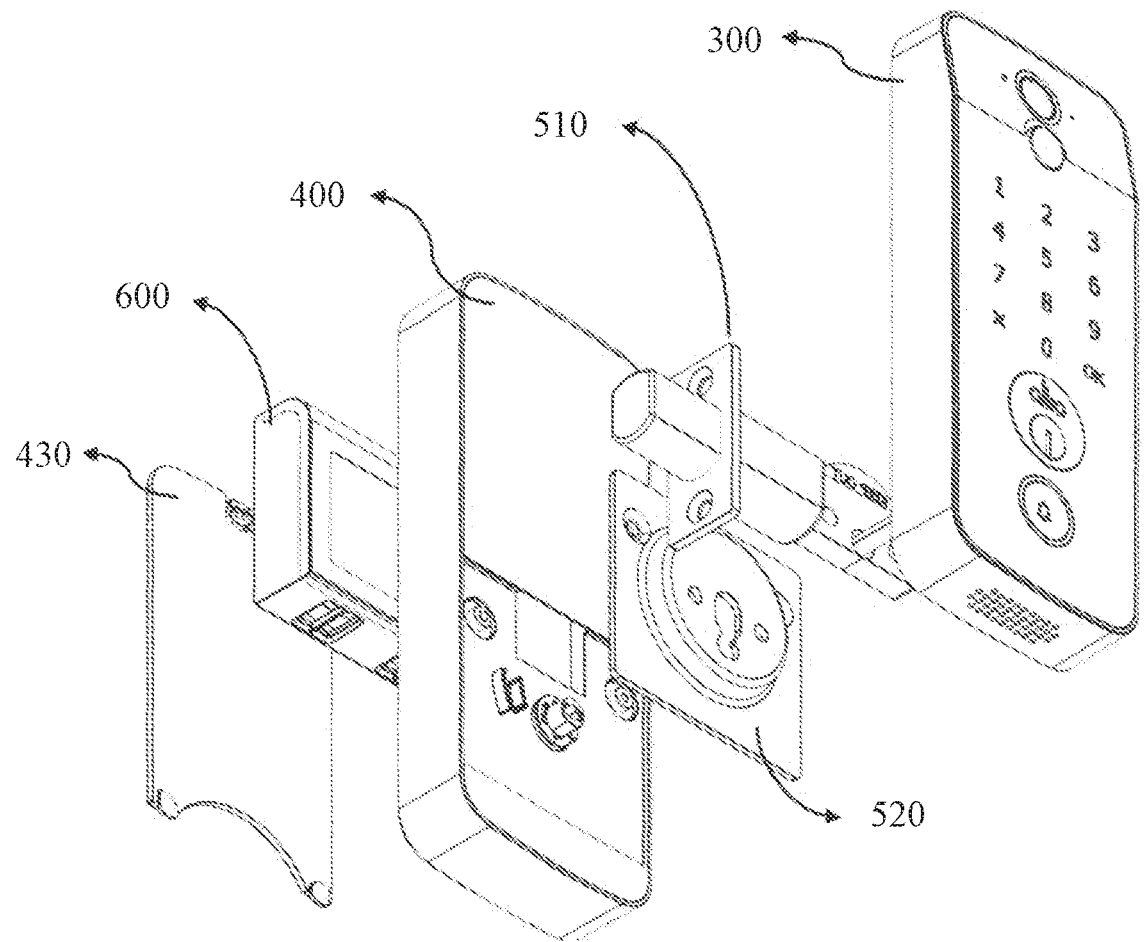
FIG. 5A is an exploded view of the smart lock according to an exemplary embodiment of the present invention.
Figure 5B:
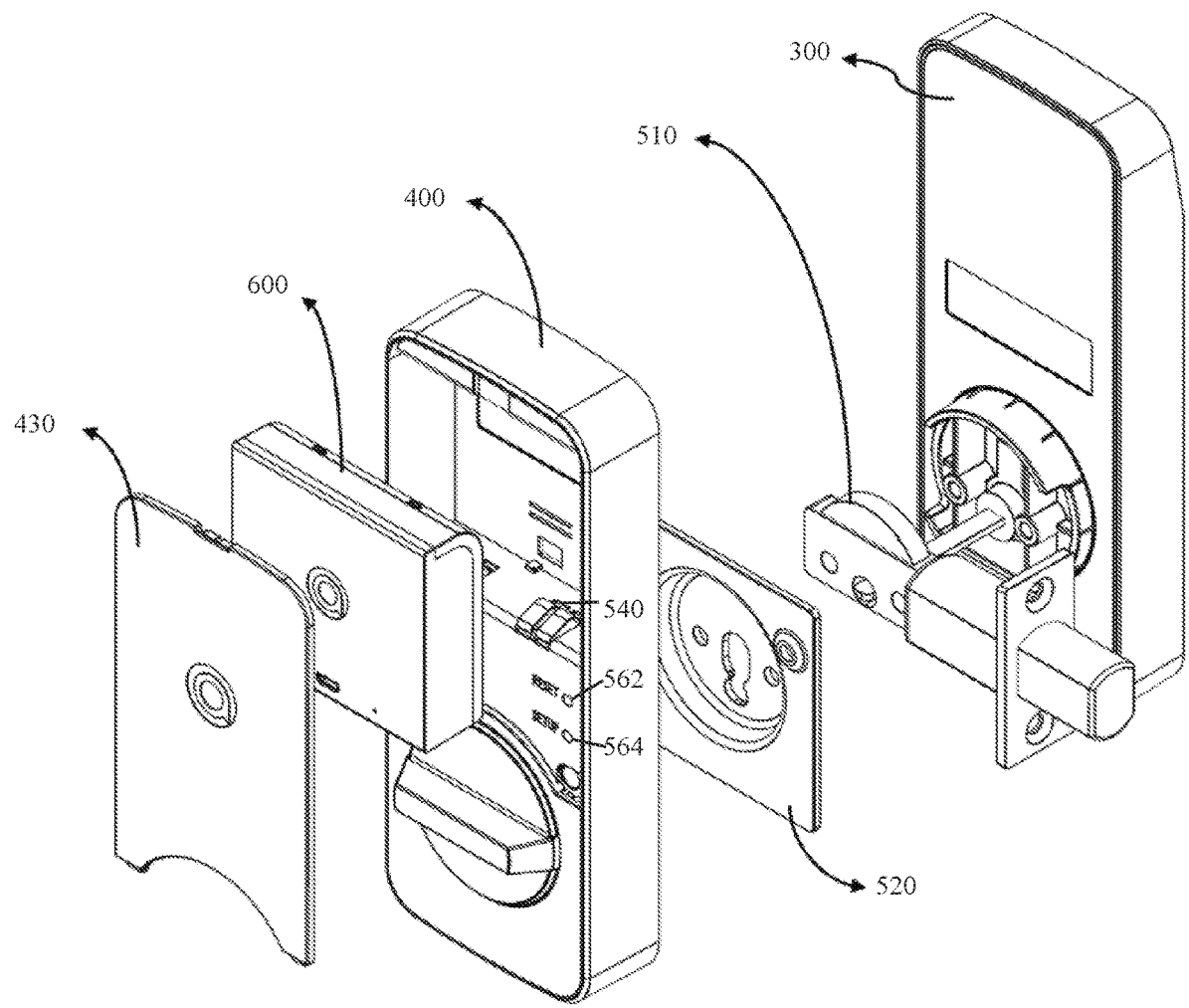
FIG. 5B is another exploded view of the smart lock according to an exemplary embodiment of the present invention.

FIGS. 5A-5B are exploded views of the smart lock 200 according to an exemplary embodiment of the present invention. As shown in FIG. 5A, the smart lock 200 includes the outer unit 300, a deadbolt latch 510, an optional mounting plate 520, the inner unit 400, a battery pack 600, and the battery door 430. The deadbolt latch 510 may be any locking mechanism that locks a door 201 when extended into the jam of the door 201. The mounting plate 520 secures the inner unit 400 to the inside of the door 201.

As shown in FIG. 5B, removing the battery door 430 reveals that the inner unit 400 also includes electrical contacts 540, a reset button 562, and a setup button 564. The electrical contacts 540 enable the inner unit 400 to receive power from the battery pack 600, which is then also supplied to the outer unit 300 via the interconnect port 490 of the outer unit 400 and the interconnect cable 390 of the outer unit 300. The reset button 562 enables a user to reset the smart lock 200 and the setup button 564 enables the user to put the smart lock 200 into a setup mode.

Figure 6A:
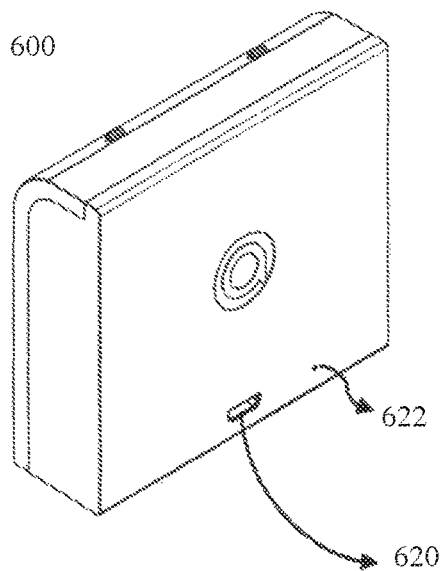
FIG. 6A is a diagram of a battery pack according to an exemplary embodiment of the present invention.

FIGS. 6A-6E are views of the battery pack 600 according to an exemplary embodiment of the present invention. As shown in FIG. 6A, the battery pack 600 includes a power port 620 and may include a charging indicator 622. The power port 620 may be any hardware interface enabling the battery pack 600 to be supplied (and resupplied with power). The power port 620 may be, for example, a micro-USB (universal serial bus) port. The charging indicator 622 may be any output device that outputs an indicating that the battery pack 600 is charging. The charging indicator 622, for example, may be an LED light. The battery pack 600 may be a rechargeable lithium ion battery with parallel cell configuration and a 10 Amp-hour capacity. The battery pack 600 may include overcurrent protection, over discharge protection, over charge protection, and over temperature protection. The battery pack 600 may provide a nominal voltage of 3.6 volts at a maximum weight of 160 grams.

Figure 6B:
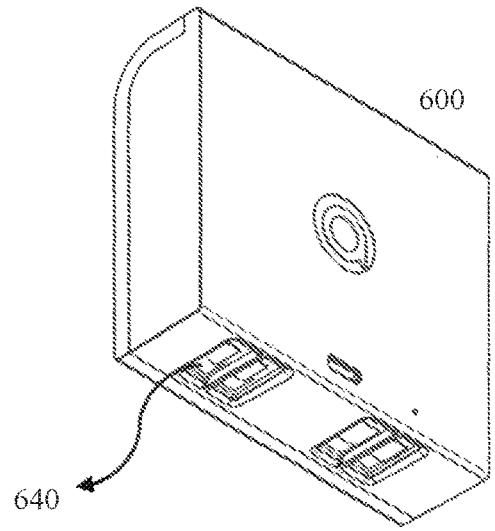
FIG. 6B is another view of the battery pack according to an exemplary embodiment of the present invention.
Figure 6C:
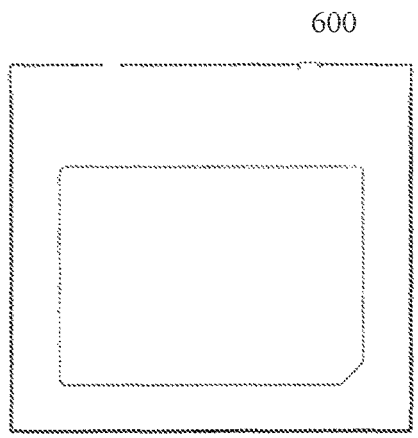
FIG. 6C is another view of the battery pack according to an exemplary embodiment of the present invention.
Figure 6D:
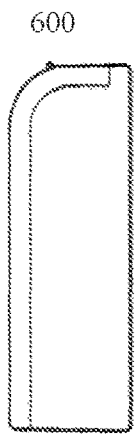
FIG. 6D is another view of the battery pack according to an exemplary embodiment of the present invention.
Figure 6E:
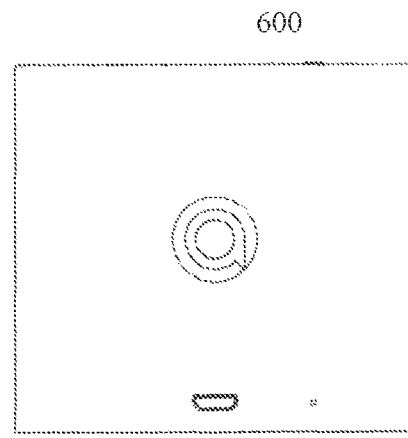
FIG. 6E is another view of the battery pack according to an exemplary embodiment of the present invention.

As shown in FIG. 6B, the battery pack 600 also includes electrical contacts 640. When installed in the inner unit 400 (as shown, for example, in FIG. 5B), the electrical contacts 640 of the battery pack 600 make contact with the electrical contacts 540 of the inner unit 400 and transfer power to the inner unit 400. FIG. 6C is a back view of the battery pack 600 according to an exemplary embodiment of the present invention. As shown in FIG. 6C, the back of the battery pack 600 may also include an information label 662. FIG. 6D is a side view of the battery pack 600 according to an exemplary embodiment of the present invention. FIG. 6E is a front view of the battery pack 600 according to an exemplary embodiment of the present invention.

Figure 7:
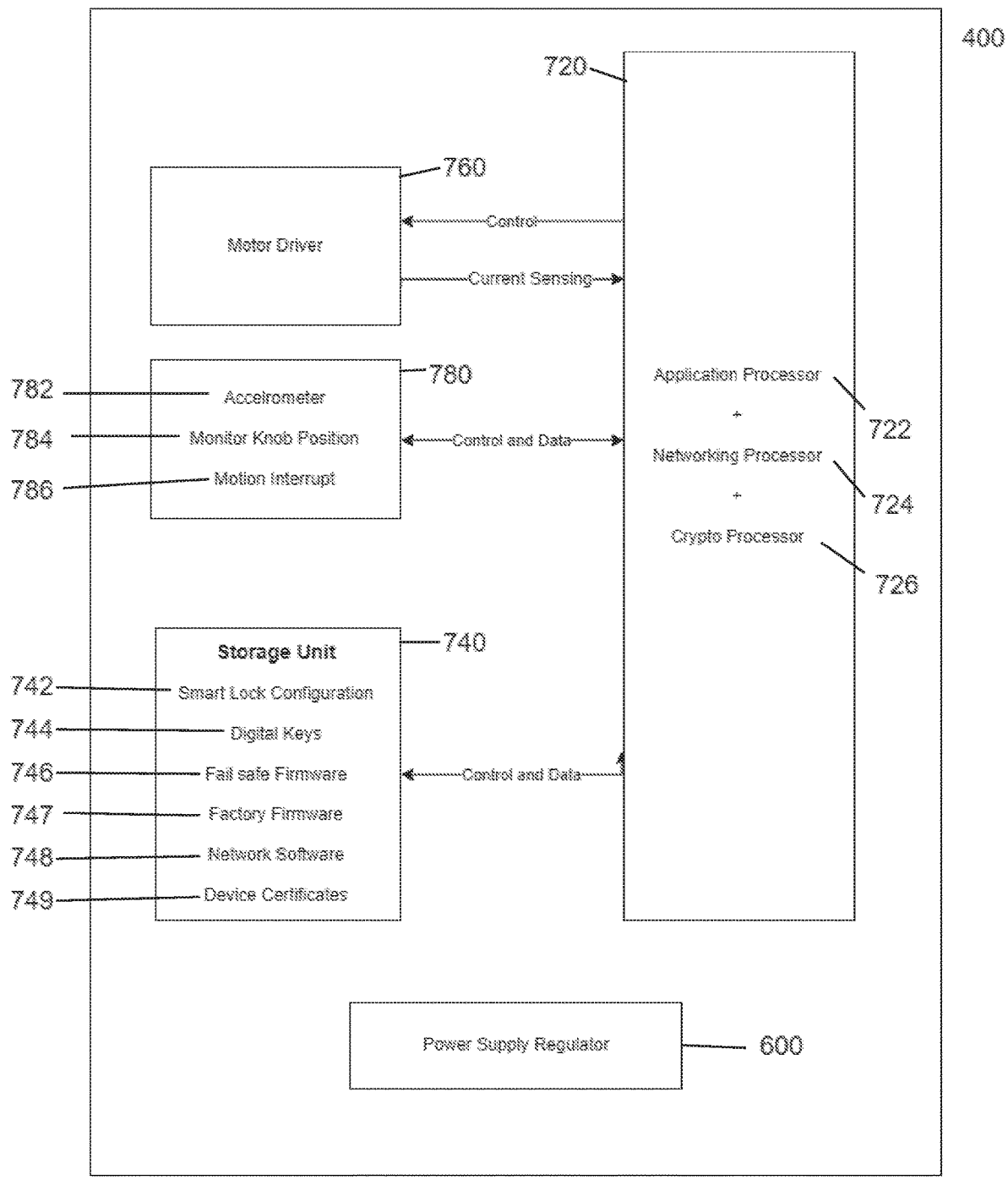
FIG. 7 is a schematic diagram of the inner unit of the smart lock according to an exemplary embodiment of the present invention.

FIG. 7 is a schematic diagram of the inner unit 400 according to an exemplary embodiment of the present invention. The inner unit 400 includes processing unit(s) 720, a storage unit 740, a motor driver 760, a lock controller 780, and the battery pack 600. The processing unit(s) 720 may be any hardware computer processor capable of carrying out the instructions such that the smart lock 200 can perform the functions described herein. The processing unit(s) 720 include an application processing unit 722, a networking processing unit 724, and a cryptography processing unit 726. The processing unit(s) 720 may be realized by a single integrated circuit (IC) chip or multiple hardware devices.

The application processing unit 722 may be any hardware computer processor capable of carrying out the instructions such that the smart lock 200 can perform the functions described herein. The networking processing unit 724 may be any hardware device capable of transmitting and receiving wireless signals such that the smart lock 200 is able to bidirectionally communicate with the user devices 120 and the remote servers 180 via the local area network 130. For example, the networking processing unit 724 may be a dual band (2.4 GHz and 5 GHz WiFi network processor). The cryptography processing unit 726 may be any hardware computer processor capable of encrypting information stored in the storage unit 740 and/or transmitted via to the remote server(s) 180 via the wide area network 160. The cryptography processing unit 726 may encrypt information, for example, using the transport layer security (TLS) 1.2 protocol.

The storage unit 740 may be any non-transitory computer-readable storage medium (e.g., flash memory) capable of storing the data necessary for the smart lock 200 to perform the functions described herein. The storage unit 740, for example, stores smart lock configuration 742, digital keys 744, fail safe firmware 746, network firmware 747, and device certificate(s) 748. The device certificate(s) 748 are used in a transport layer security/secure sockets layer (TLS/SSL) handshake process to authenticate both the remote server(s) 180 and the smart lock 200. The digital certificate(s) 748 contains the public key of the smart lock 200 and information that specifies the smart lock's ownership of the key. The device certificate(s) 748 are used by the remote server(s) 180 to authenticate a genuine smart lock 200. The device certificate(s) 748 are generated during product assembly and remain unchanged during the lifetime of the smart lock 200. The digital keys 744 are the codes, usually selected by the user, that enable the user to open the smart lock 200 using the keypad 340.

The motor driver 760 may be any device capable of driving the motor 1260 (shown in FIGS. 12-13 and described below) in response to electrical signals supplied by the processing unit(s) 720. The lock controller 780 may include hardware devices capable of monitoring and the position, speed, and/or acceleration of the manual knob 540 and, by extension, the deadbolt latch 510. For example, the lock controller 780 may include an accelerometer 782 (e.g., a 3-axis accelerometer), a deadbolt latch position sensor 784, and a motion interrupt 786. The battery pack 600 supplies power to the hardware components of the inner unit 400 (e.g., the processing unit(s) 720, the motor driver 760, etc.). In some embodiments, the smart lock 200 may include a wired connection to a power source (rather than the battery pack 600).

Figure 8:
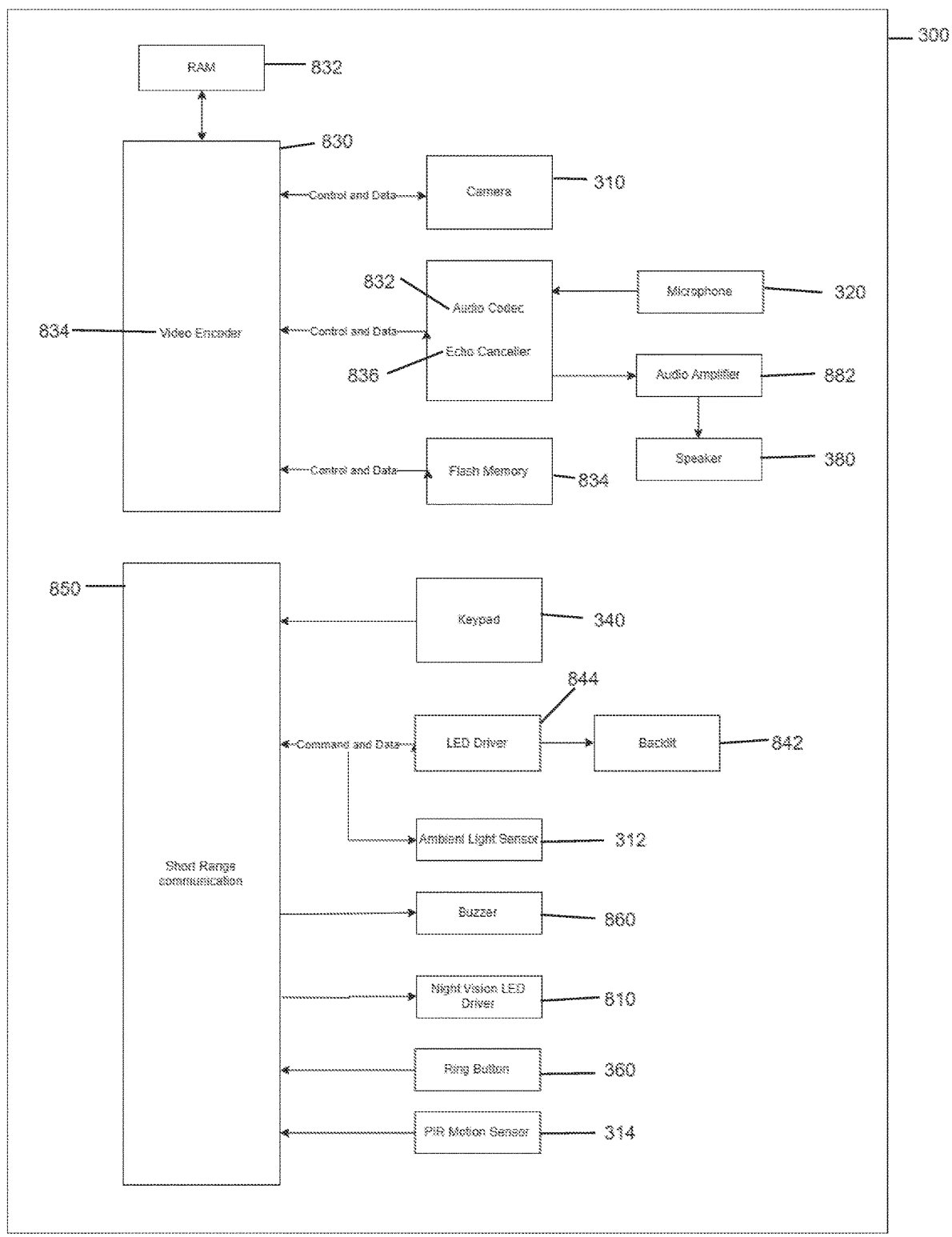
FIG. 8 is a schematic diagram of the outer unit of the smart lock according to an exemplary embodiment of the present invention.

FIG. 8 is a schematic diagram of the outer unit 300 according to an exemplary embodiment of the present invention. The outer unit 300 includes the camera 310, the microphone 320, the speaker 380, the keypad 340, the ambient light sensor 312, and the lock/ring button 360. Each of those input/output devices are included in the outer unit 300 of the smart lock 200 (as opposed to the inner unit 400) to provide functionality to users (and sense the ambient light) outside the door 201.

The outer unit 300 also includes an audio/video controller 830, a short-range communication unit 850, and a buzzer 860. The audio/video controller 830 may store data in memory 832 and memory 834. The camera 310 may include a night vision LED driver 810. The loud speaker 380 may include an audio amplifier 882. The keypad 340 may include a keypad backlight 842 and an LED driver 844.

The audio/video controller 830 may include an audio codec 832, a video encoder 834, and an acoustic echo canceller 836. The audio codec 832 may be any hardware device or software computer program capable of converting analog audio signals (received by the microphone 320) into digital signals and encoding those digital signals for transmission and storage. The video encoder 834 may be may be any hardware device or software computer program capable of encoding (e.g., compressing) video signals received from the camera 310 for transmission and storage. The acoustic echo canceller 836 may be any hardware device or software computer program capable of improving the audio quality of the audio signals received by the microphone 320 by preventing echo from being created and/or removing it after it is already present. The short-range communication unit 850 may include hardware device(s) capable of transmitting and receiving wireless signals such that the smart lock 200 is able to communicate with the user devices 120 directly, wirelessly, and bidirectionally (e.g., using Bluetooth Low Energy (BLE) wireless personal area network technology). The short-range communication unit 850 may include, for example, a Bluetooth low energy network controller. The memory 832 and/or the memory 834 may be any non-transitory computer-readable storage medium capable of storing the data. For example, the memory 832 may be low power double data rate (LPDDR) Random Access Memory (RAM) and the memory 834 may be serial peripheral interface (SPI) flash memory. The audio amplifier 882 may be any hardware device capable of amplifying the audio signals output by the loud speaker 380. The keypad backlight 842 may be any light source (e.g., one or more LEDs) capable of illuminating the keypad 340. The LED driver 844 may be any hardware device capable of controlling the keypad backlight 842. The buzzer 860 may be any audio signaling device (e.g., mechanical, electromechanical, or piezoelectric) capable of audibly indicating that a user has pressed the lock/ring button 360. The night vision LED driver 810 may be any hardware device that enables the camera 310 to obtain images in low light conditions, for example by flooding the area in the path of the camera 310 with light that is outside the visible spectrum (e.g., infrared light).

The components of the inner unit 400 shown in FIG. 7 and the components of the outer unit 300 shown in FIG. 8 communicate, for example, using an inter-integrated circuit ($I^2C$) bus, a serial peripheral interface (SPI), and/or the mobile industry processor interface (MIPI). The components of the outer unit 300 communicate with the components of the inner unit 400 (and vice versa) via the interconnect cable 390 (shown in FIG. 3) and the interconnect port 490 (shown in FIG. 4). Other than the input/output devices of the outer unit 300 described above, components are shown in the outer unit 300 and/or the outer unit 400 merely for convenience and may be located in either the outer unit 300 or the outer unit 400.

Referring back to FIGS. 3A and 4A, the smart lock 200 includes a lock/ring button 360 on the outer unit 300 and a manual knob 420 on the inner unit 400. The manual knob 420 provides functionality for the user to manually lock and unlock the deadbolt latch 510 (shown in FIGS. 5A-5B) from the inside of the door 201. On the outside of the door 201, the smart lock 200 provides functionality for the user to lock the deadbolt latch 510 by pressing the lock/ring button 360 for longer than a predetermined time period (commonly referred to as "a long press").

Referring back to FIG. 1, the smart lock system 100 enables the user devices 120 to control the smart lock 200 by sending instructions either directly to the smart lock 200 (using short range, wireless communication and/or via the local area network 130) and/or by sending instructions to the remote server(s) 180, which in turn send instructions to the smart lock 200 via the wide area network 160. The smart lock 200 also provides status information (e.g., the charge level of the battery pack 600, whether the deadbolt latch 510 is locked or unlocked, etc.) and lock identification data (e.g., where the smart lock 200 is located) to the remote server(s) 180, which saves that information in the remote database 190 and provides that information to the user devices 120. The user devices 120 provide information to the remote server(s) 180, including user account information and the digital keys 744 that enable the user to open the smart lock 200 using the keypad 340. The remote server(s) 180 sends those digital keys 744 (along with status and configuration updates) to the smart lock 200, which stores those updates in the local storage unit 740 (shown in FIG. 7). The remote server(s) 180 sends an update to the smart lock 200 every time there is an update to the digital keys 744 stored in the remote database 190 to ensure that the user is always able to use the latest digital keys 744 to unlock the smart lock 200. Meanwhile, information stored in the local storage unit 740 is backed up to the remote database 190. Sensitive information stored in the local storage unit 740 and/or transmitted via the wide area network 160 is encrypted (for example, by the cryptography processing unit 726).

The remote server(s) 180 also provide functionality for users to receive information regarding the smart lock 200 and control the smart lock 200 using a virtual assistant platform (e.g., Google Home, Alexa, Siri, etc.) installed on a user device 120. (GOOGLE HOME is a registered trademark of Google LLC. ALEXA is a registered trademark of Amazon Technologies, Inc. SIRI is a registered trademark of Apple Inc.)

The smart lock 200 communicates with user devices 120 using short range, wireless communication (e.g., Bluetooth Low Energy), enabling the user to lock and unlock the smart lock 200 with a user device 120 in close range (e.g., within about 5 meters of the smart lock 200). The smart lock 200 may also communicate with the user device 120 via the local area network 130 (e.g., home WiFi network), enabling users to remotely monitor, lock and unlock, access security settings, and receive real-time alerts regarding the smart lock 200 with any user device 120 connected to the local area network 130. Because the smart lock 200 communicates with the remote server(s) 180 via the local area network 130 and the wide area network 160, the remote server(s) 180 enable users to remotely monitor, lock and unlock, access security settings, and receive real-time alerts regarding the smart lock 200 with any user device 120 connected to the local area network 130 or even the wide area network 160.

To enable the user device 120 to control the smart lock 200 and receive information regarding the smart lock 200, the smart lock system 100 may provide a software application (e.g., a smartphone application) for the user device 120. In some embodiments, the software application may be downloadable to the user device 120 for installation on the user device 120. In other embodiments, the software application may be server-based (e.g., a webpage provided by the server(s) 180) with functionality that is accessible via the user device 120 (e.g., via a web browser).

The software application enables the user to output instructions to the remote server(s) 180 (e.g., via the API server 182) to control the smart lock 200. The software application also displays alerts received from the remote server(s) 180 (e.g., from the push server 184). The software application also displays video and outputs audio received from the remote server(s) 180 (e.g., from the media server 186). The software application also provides functionality for the user to output instructions directly to the smart lock 200 (e.g., using short range, wireless communication and/or via the local area network 130).

The software application enables users to create an account, for example by providing a unique (e.g., email address) and password. Account information is stored by the remote server(s) 180 in the remote database 190. The smart lock system 100 enables users to create two types of accounts: owner and guest. Owners also register their smart lock 200 as described below and provide a digital key 744 to unlock the smart lock 200 using the keypad 340. Owners have unlimited access to receive information from and control their smart lock 200 and can create, edit, and delete other user accounts.

Figure 9:
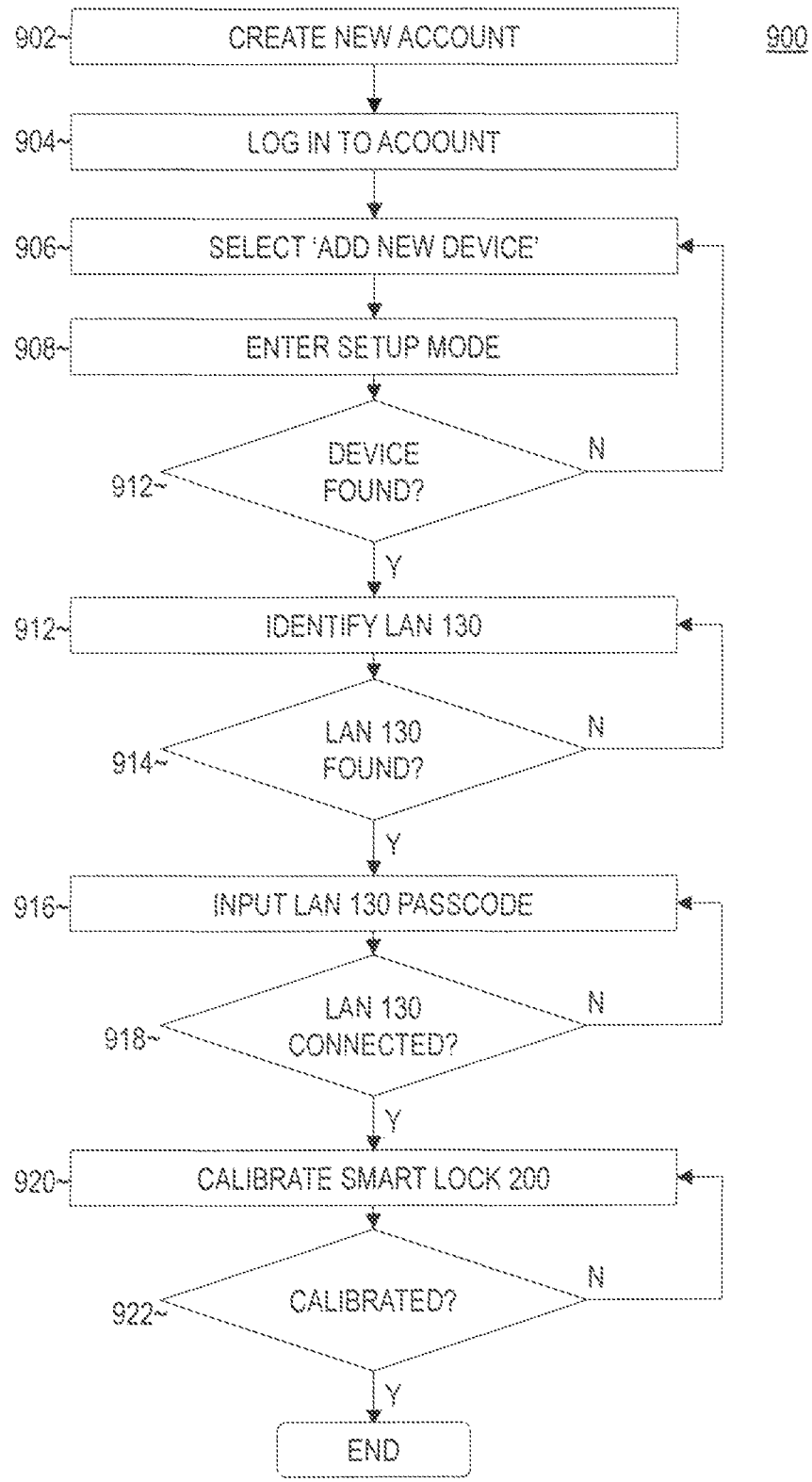
FIG. 9 is a flowchart illustrating a process for pairing the smart lock with a user device according to an exemplary embodiment of the present invention.

FIG. 9 is a flowchart illustrating a process 900 for pairing a smart lock 200 with a user device 120 and enabling the smart lock 200 to communicate via a local area network 130 according to an exemplary embodiment of the present invention. To pair the smart lock 200 with a user device 120, the user must bring the user device 120 within range to communicate directly (e.g., using Bluetooth Low Energy). The user creates a new account in step 902 and logs in to the new account in step 904 using the software application as described above. The software application provides functionality for the user to initiate the device pairing process in step 906, for example by selecting an "add new device" button.

The user places the smart lock 200 in a setup mode in step 908, for example by pressing the setup button 564 (shown in FIG. 5B). The smart lock 200 then outputs a signal to wirelessly pair with a nearby user device 120 (e.g., using Bluetooth Low Energy). If the user device 120 is able to pair with the smart lock 200 (step: 910: Yes), the software application provides functionality for the user to identify the local area network 130 in step 912, for example by presenting a list of local area networks that are within range and providing functionality for the user to select the user's local area network 130. If the local area network 130 is found (step 914: Yes), the software application provides functionality for the user to identify the passcode for the local area network 130 in step 916.

If the smart lock 200 is able to connect to the local area network 130 (step 918: Yes), the software application provides functionality for the user to calibrate the smart lock 200 in step 920. Calibrating the smart lock 200 enables the smart lock 200 to properly lock and unlock when installed in the specific door 201. For example, the user may be asked to move the manual knob 420 (shown in FIG. 4A) into the locked position and indicate (using the user device 120) that the deadbolt latch 510 (shown in FIGS. 5A-5B) is in the locked position. The user device 120 outputs an indication to the smart lock 200 that the manual knob 420 is in the locked position using direct wireless communication (e.g., Bluetooth low energy). The smart lock 200 then determines the position of the manual knob 420 (determined, for example, by the knob position monitor 784 shown in FIG. 7) when the start lock 200 is in the locked position and stores that information (for example as part of the smart lock configuration information 742 in the storage unit 740 shown in FIG. 7). The user may then be asked to move the manual knob 420 into the unlocked position and indicate (again using the user device 120) that the deadbolt latch 510 is in the unlocked position. Again, the user device 120 outputs an indication to the smart lock 200 that the manual knob 420 is in the locked position, the smart lock 200 determines the position of the manual knob 420 (e.g., using the knob position monitor 784) when the smart lock 200 is in the unlocked position and stores that information (e.g., as part of the smart lock configuration information 742 in the storage unit 740). Once the smart lock 200 is calibrated (step 922: Yes), the smart lock 200 is able to use those positions (and the distance between those positions) in order to electronically lock and unlock the deadbolt latch 510.

By adding pairing the smart lock 200 with the user's account using the process 900, the user becomes an owner of that smart lock 200. The software application may provide functionality for user to personalize the smart lock 200, for example by adding a picture and/or a name (e.g., "front door", "vacation home", etc.). The software application may also provide functionality to identify the location of the smart lock 200 based on the location of the user device 120 (determined, for example, using the global positioning system (GPS)).

The user can also unlock the smart lock 200 using the keypad 340. As described above, each user has at least one digital key 744 (for example, selected by the user using the software application on a user device 120). Digital keys 744 are sent by the user device 120 to the remote server(s) 180, stored in the remote database 190, and sent to the smart lock 200 for storage in the local storage unit 740 (shown in FIG. 7). Each time the user attempts to operate the smart lock 200 using the keypad 340, the smart lock 200 checks the validity of the digital key 744 (as well as the permission level of the user) the local storage unit 740 and responds accordingly. If the digital key 744 input via they keypad 340 matches a digital key 744 stored in the local storage unit 740, the smart lock 200 unlocks the deadbolt latch 510 (shown in FIGS. 5A and 5B). If the digital key 744 input via they keypad 340 is invalid, the smart lock 200 provides audible and/or visual feedback (e.g., a blinking pattern on the keypad 340) to indicate the invalidity of the digital key 744. The remote server(s) 180 sends an update to the smart lock 200 every time there is an update to the digital keys 744 stored in the remote database 190 to ensure that the user is always able to use the latest digital keys 744 to unlock the smart lock 200. Because the digital keys 744 are stored locally local storage unit 740, the smart lock 200 provides access to the user via the keypad 340 even if the remote server(s) 180 or wide area network 160 is inaccessible. The key hole 350 provides emergency access using physical key in the event of electronics failure (for example, if the battery pack 600 has been drained).

The software application also provides functionality for owners to create temporary digital keys 744 using the user device 120 and share those temporary digital keys 744 with others. Owners can configure the smart lock 200 to grant permanent or temporary access via a temporary digital key 744 using the software application. Those temporary digital keys 744 (and associated permissions) are sent to the remote server(s) 180 for storage in the remote database 190 and then to the smart lock 200 for storage in the local storage unit 740.

The smart lock 200 may be locked and unlocked by a user in four ways: manually, remotely (with the user device 120), at close range (with the user device 120), and automatically when the user device 120 is in range. Because the smart lock 200 may be locked and unlocked remotely by the server(s) 180, a user device 120 can lock or unlock the smart lock 200 from anywhere in the world with access to the wide area network 160. As described above, the software application allows users to view the status of any smart lock 200 paired with the user device 120. The software application then provides functionality for the user to change the status (i.e., lock or unlock) the smart lock 200. The user device 120 sends a command to the server(s) 180, which in turn sends a command to the smart lock device 200. Thus, for example, if the lock 200 is in the locked position, the user can use the user device 120 to unlock the door, such as if someone rings the bell and the user decides to allow that person into the home. If the lock 200 is in the unlocked position, the user can use the user device 120 to lock the door.

When the status of the smart lock 200 changes (in response to any locking or unlocking operation—manual, remote, close range, automatically), the smart lock 200 updates the server(s) 180 and the server(s) 180 allow the user to view the updated status of the smart lock 200 via the software application. Changes to the status of the smart lock 200 are logged by the server(s) 180, which can be viewed via the software application. In a preferred embodiment, the location of the user device 120 is not captured when remotely locking or unlocking the smart lock 200.

Figure 10:
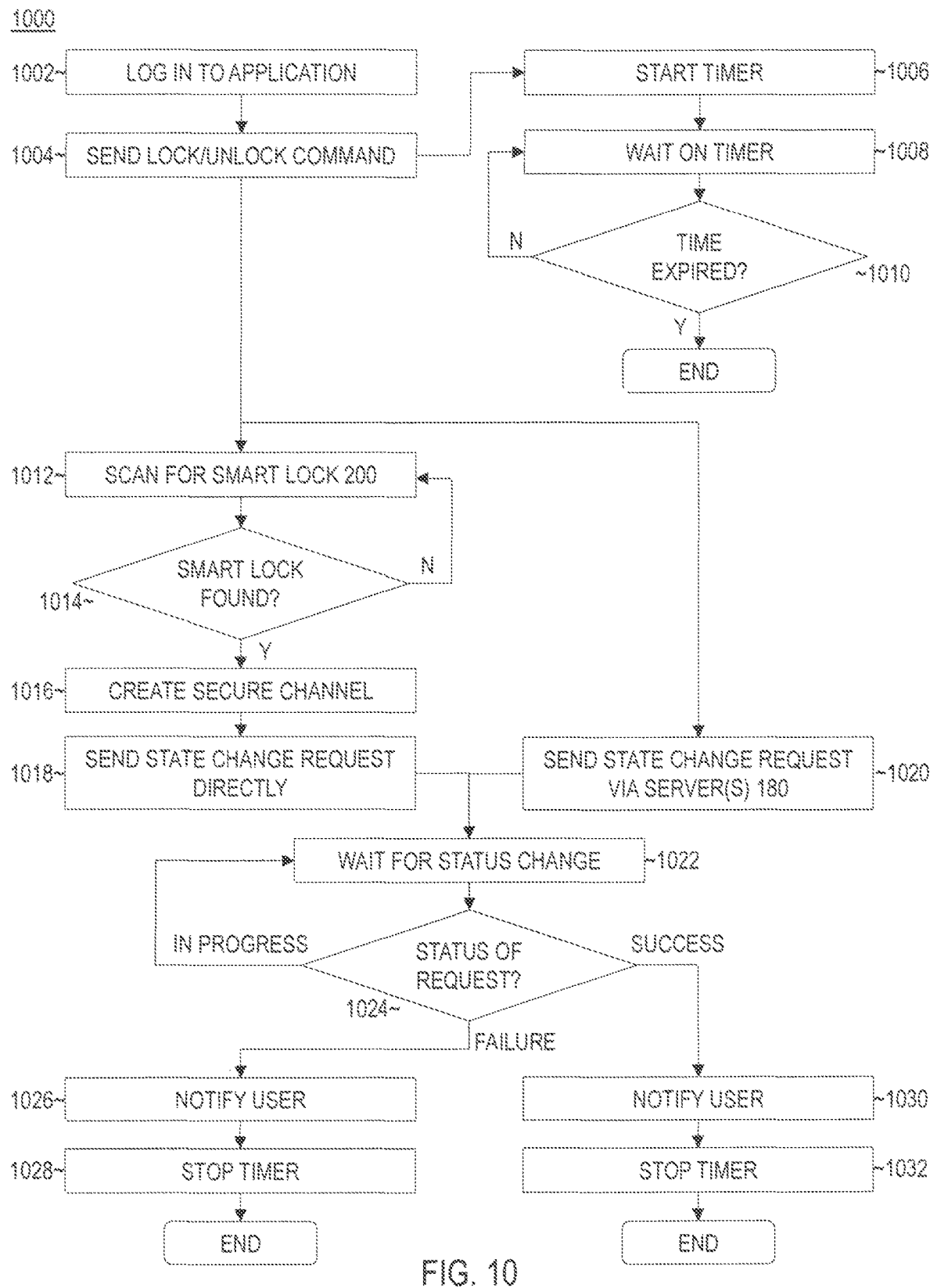
FIG. 10 is a flowchart illustrating a process for locking or unlocking the smart lock with a user device in close range of the smart lock according to an exemplary embodiment of the present invention.

FIG. 10 is a flowchart illustrating a process 1000 for locking or unlocking a smart lock 200 with a user device 120 in close range of the smart lock 200 according to an exemplary embodiment of the present invention. The user logs in to the software application in step 1002 and sends a command to lock or unlock the smart lock 200 (using functionality provided by software application) in step 1004. Because the software application may be used to control more than one smart lock 200, sending the command to lock or unlock a particular smart lock 200 may require the user to select the particular smart lock 200 to lock or unlock. Sending the command to lock or unlock the smart lock 200 in step 1004 causes three processes to run simultaneously. First, a timer starts in step 1006 and the system waits for the timer to expire in step 1008. If the timer has not expired (Step 1010: No), the system returns to step 1008 and continues to wait for the timer to expire. If the timer has expired (Step 1010: Yes), the process 1000 ends.

Sending the command to lock or unlock the smart lock 200 in step 1004 also causes the user device 120 to scan for the selected smart lock 200 using direct wireless communication (e.g., Bluetooth low energy) in step 1012. If the smart lock 200 is found (Step 1014: Yes), the user device 120 establishes a secure channel using direct wireless communication in step 1016 and sends a state change request to the smart lock 200 to either lock or unlock the smart lock 200 in step 1018.

Sending the command to lock or unlock the smart lock 200 in step 1004 also causes the user device 120 to send the command to lock or unlock the smart lock 200 to the server(s) 180 via (the local area network 130 and) the wide area network 160 (as described above) in step 1020. The command to lock or unlock the smart lock 200 is then sent both directly (using short range, wireless communication) and indirectly via the server(s) 180 and the smart lock 200 responds in response to whichever command is received first. The user device 120 then polls the smart lock 200 for an update to the status of smart lock 200 and waits for an update to the status of the smart lock 200 (either directly from the smart lock 200 or from the server(s) 180) in step 1022.

If the request to change the status of the smart lock 200 is still in progress (Step 1024: In Progress), the user device 120 returns to step 1022 and continues to wait for an update to the status of the smart lock 200 either directly from the smart lock 200 or from the server(s) 180. If the change of status fails (Step 1024: Failure), the user is notified of the failure to lock or unlock the smart lock 200 in step 1026 and the timer is stopped in step 1028. If the change in status is successful (Step 1024: Success), the user is notified of the successful change to the status of the smart lock 200 in step 1030 and the timer is stopped in step 1032.

Because the software application causes the user device 120 to output the instruction to the server(s) 180 in step 1020, the user can control the smart lock 200 from anywhere with access to the wide area network 160. Because the software application causes the user device 120 to outputting the instruction directly to the smart lock in step 1018, the user can control the smart lock 200 regardless of whether the server(s) 180 and/or the wide area network 160 are available at that moment. By simultaneously outputting instructions both to the server(s) 180 and directly to the smart lock 200, the smart lock system 100 eliminates the need for the user to decide the best way to communicate with the smart lock 200. Instead, the user simply presses one button on the software application to lock or unlock the smart lock 200 and the smart lock 200 responds to the user instruction regardless of the communication network used by the smart lock system 100 to deliver that instruction.

The smart lock 200 also provides a user carrying a user device 120 with keyless entry functionality. If the user has keyless entry functionality enabled (e.g., via the software application), the software application uses the location tracking capabilities (e.g., GPS) of the user device 120 to determine if the user device 120 has entered or exited a predefined geofenced region around the smart lock 200. The radius around the smart lock 200 of the predefined geofenced region may be defined up by the user via the software application. When the user device 120 exits and then enters the predefined geofenced region, the software application initiates the procedure for the user device 120 to unlock the smart lock 200 directly using short range, wireless communication (e.g., Bluetooth Low Energy). Then, when the user device 120 is within range of the smart lock 200, the software application sends an unlock command to the smart lock 200, and the smart lock 200 unlocks the deadbolt latch 510. In one embodiment, each time the smart lock 200 automatically unlocks in response to the presence of a user device 120, the smart lock 200 will automatically relock the deadbolt latch 510 after a preset time period, which may be specified by the user via the software application.

By providing keyless entry functionality, users can unlock their smart lock 200 without even having to enter their digital key 744 via the keypad 340 or using the software application on their user device 120. Additionally, the keyless entry functionality provided by the smart lock system 100 is triggered by the location of the user's user device 120 (e.g., smartphone), which the user is likely to carry with him or her nearly every day. Accordingly, the smart lock system 100 eliminates the need to distribute single purpose transmitters used by other keyless entry systems and instead uses the multi-function device that most users will already be carrying.

When a visitor presses the lock/ring button 360 for less than the predetermined time period (commonly referred to as a "short press"), the smart lock 200 enables audio and video communication between the visitor (via the smart lock 200) and the user (via the user device 120). The smart lock 200 captures video using the camera 310 and outputs that video to the server(s) 180 (e.g., the media server 186), which then outputs that video to the user device 120 for display to the user via the software application. The smart lock 200 also captures audio using the microphone 320 and outputs that audio to the server(s) 180 (e.g., the media server 186), which then outputs that audio to the user device 120. The software application also captures audio from the user (using a microphone of the user device 120) and outputs that audio via the server(s) 180 (e.g., the media server 186) to the smart lock 200, which outputs that audio via the speaker 380.

Figure 11:
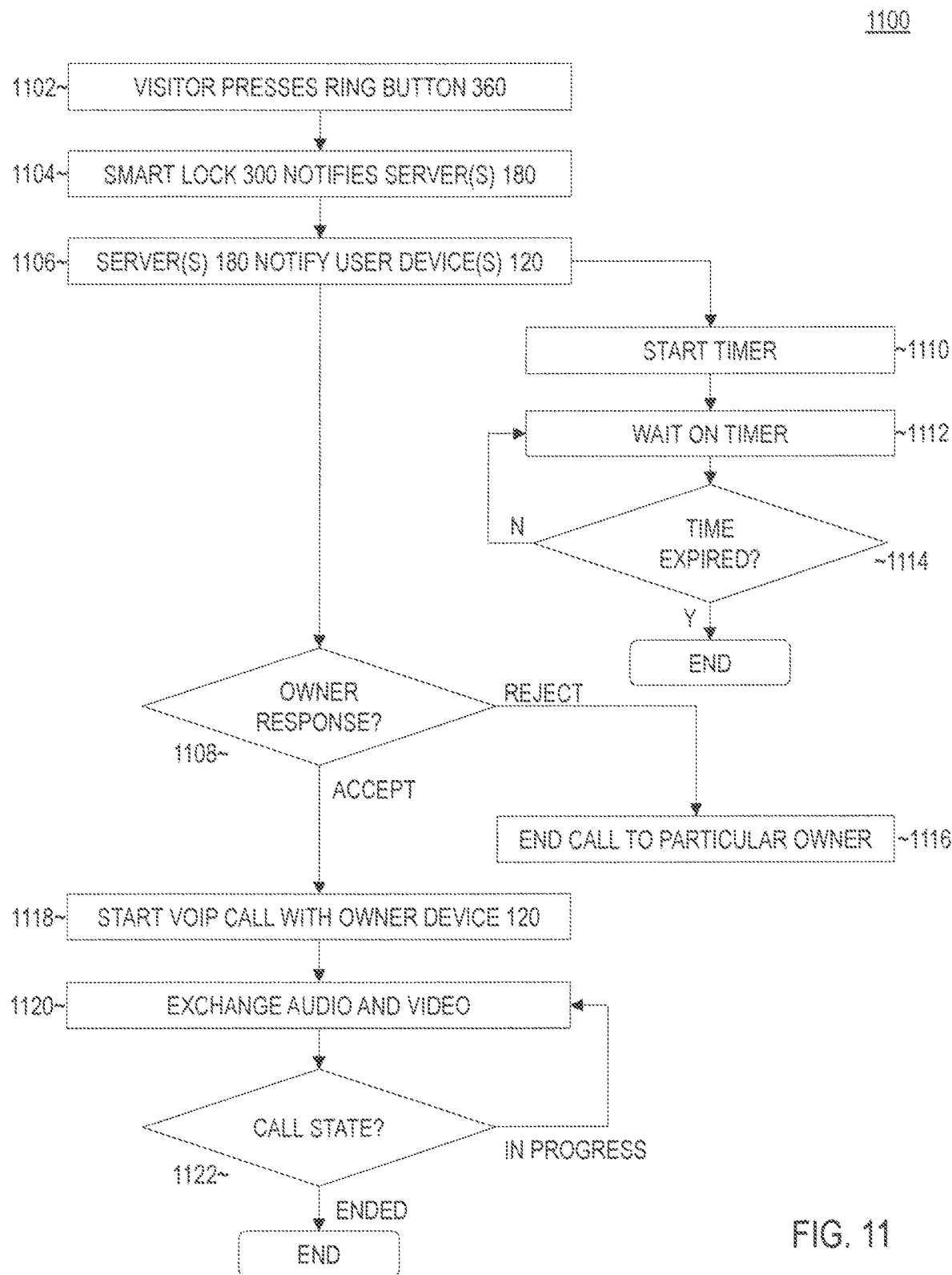
FIG. 11 is a flowchart illustrating a process for establishing an audio and video connection between the smart lock and a user device according to an exemplary embodiment of the present invention.

FIG. 11 is a flowchart illustrating a process 1100 for establishing an audio and video connection between the smart lock 200 and a user device 120 according to an exemplary embodiment of the present invention. In response to a visitor short pressing the lock/ring button 360 in step 1102, the smart lock 200 notifies the server(s) 180 in step 1104. The server(s) 180 output an alert to all of the user device(s) 120 associated with an owner of the smart lock 200 in step 1106 and awaits a response from an owner in step 1108. A timer is also started in step 1110 and the system waits for the timer to expire in step 1112. If the timer has not expired (Step 1114: No), the system returns to step 1112 and continues to wait for the timer to expire. If the timer expires without a response from an owner (Step 1114: Yes), the process 1100 ends.

Each owner can reject a call from the smart lock 200. If any owner rejects the call (Step 1108: Reject), the call to that particular owner ends in step 1116. If any owner accepts the call (Step 1108: Accept), a voice over internet protocol (VOIP) call is established in step 1118 between the server(s) 180 and the user device 120 of the owner that accepted the call in step 1108. Audio and video are exchanged between the smart lock 200 and the user device 120 in step 1120, which continues (Step 1122: In progress) until the call ends (Step 1122: Ended).

As described above, the smart lock 200 provides 1-way video and 2-way audio between the user and a visitor, enabling the user to see who is at the door 201 and speak to him or her from any user device 120 with access to the wide area network 160. Then, the user can decide whether to remotely unlock the smart lock 200 via the user device 120 as described above.

The smart lock 200 also provides live video on demand to any owner via the user device 120. The software application provides functionality for the user to output a command to the smart lock 200 via the server(s) 180 requesting a live view. In response to the request, the smart lock 200 captures video using the camera 310, which is output to the server(s) 180 for transmittal to the user device 120 and display via the software application. In some embodiments, the live video includes audio captured by the microphone 320.

The smart lock 200 also provides motion alerts to the user devices 120. When the motion sensor 314 of the smart lock 200 detects motion, the smart lock 200 records video using the camera 310 and uploads that video to the server(s) 180 (e.g., the media server 186). In some embodiments, the video may be a short (e.g., 10 second) video clip. In some embodiments, the video may include audio captured by the microphone 320. The server(s) 180 output the video to the user device 120, which provides functionality to view those videos via the software application. As described below, the software application provides functionality for the user to view a log of all smart lock activities, including video clips captured in response to motion detection. The software application may also be configured to output alerts for some or all smart lock activities, including video clips captured in response to motion detection. Accordingly, in combination with the other features described above, the smart lock system 100 allows users to monitor any activity outside their 201 from anywhere with access to the wide area network 160.

The smart lock 200 is also configured to provide clear video even in low light. For example, the night vision LED driver 810 may flood the area in the path of the camera 310 with light that is outside the visible spectrum (e.g., infrared light) to enable the camera 310 to obtain images in low light conditions.

The smart lock system 100 logs all smart lock activities, including locks, unlocks, video doorbell alerts, motion alerts, intrusion, account creation, account editing, account deletion, access sharing (e.g., creation of temporary digital keys 744 for guest access), etc. The log is saved by the server(s) 180 and is viewable via the user device 120 using the software application.

The software application also provides functionality to output alerts to the user in response to all or selected activities, including intrusion, video doorbell alerts, motion alerts, locks, unlocks, account creation, account editing, account deletion, access sharing (e.g., creation of temporary digital keys 744 for guest access), etc. The software application provides functionality for the user to manage those alerts, including enabling or disabling alerts for all or user-selected smart lock activities. The software application also provides functionality to respond to those alerts, for example by establishing an audio and video connection as described above with respect to FIG. 11 and/or remotely unlocking the smart lock 200.

As mentioned above, the smart lock system 100 enables users to create two types of accounts: owner and guest. An owner (i.e., a user who pairs with a smart lock 200 using the process 900 described above with reference to FIG. 9), is provided with complete access to the operations of the paired smart lock 200, including remote lock and unlock, close range lock and unlock, keyless entry, creating digital keys 744 to unlock the smart lock 200 via the keypad 340, viewing the status of the smart lock 200, changing the settings of the smart lock 200, viewing the log of smart lock activities, viewing live video, creating additional user accounts, editing the additional user account settings, deleting the additional user accounts, etc.

The owner can also create guest accounts and enable those guests to lock and unlock a selected smart lock 200 within parameters established by the owner. In some embodiments, the smart lock system 100 only enables guests to only unlock the smart lock 200 using the keypad 340 or by instructing the guest's user device 120 to communicate directly with the smart lock 200 using short range, wireless communication (e.g., Bluetooth Low Energy). Guests are provided with access to their own user account settings. In some embodiments, guest accounts are not provided with other device information (e.g., logs, settings), functionality to create additional user accounts, or the ability to unlock the smart lock remotely or using keyless entry. In some embodiments, guests cannot modify their access to the smart lock 200, except revoke their own access.

The smart lock system 100 enables owners to create three types of guest accounts: persistent, recurring, and timed. Persistent guests have continuous access to lock and unlock the smart lock 200 (e.g., only using the keypad 340 or communicating directly via short range, wireless communication). Recurring guests have access to lock and unlock the smart lock 200 (e.g., only using the keypad 340 or communicating directly via short range, wireless communication) during a time period selected by the owner on days and/or times selected by the owner. For example, recurring guests can have access only on weekday afternoons. Timed guests have continuous access to lock and unlock the smart lock 200 (e.g., only using the keypad 340 or communicating directly via short range, wireless communication) from the time that the timed guest account is created until and end date set by the owner. In addition, a guest account can be created for number of uses. For instance, a guest account can allow the guest to unlock the door no more than a set number of times defined by the owner.

To overcome security issues of prior art smart locks, the smart lock system 100 does not rely on the security methods provided by BLE specifications. Instead, the smart lock 200 is encrypted at application layer, which enables the user device 120 and the smart lock 200 to communicate using short range wireless communications (e.g., BLE). The keys used for the encryption are exchanged between the smart lock 200 and the user device 120 over a TLS1.2 connection with the remote server(s) 180. These keys are used to encrypt data between user device 120 and smart lock 200 using CHACHA20-POLY1305 Authenticated Encryption with Associated Data (AEAD).

Figure 12:
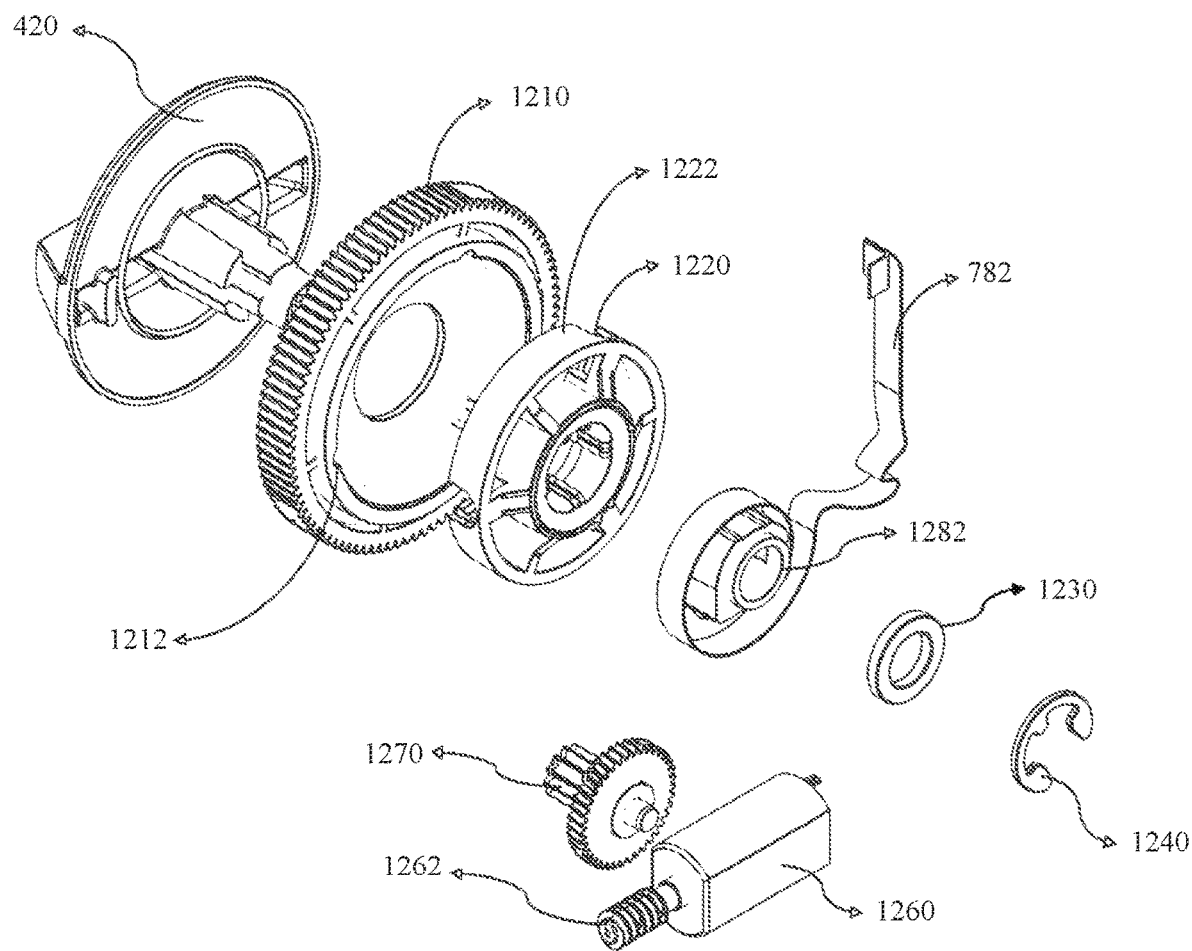
FIG. 12 is a diagram of a gear assembly of the smart lock according to an exemplary embodiment of the present invention.
Figure 13:
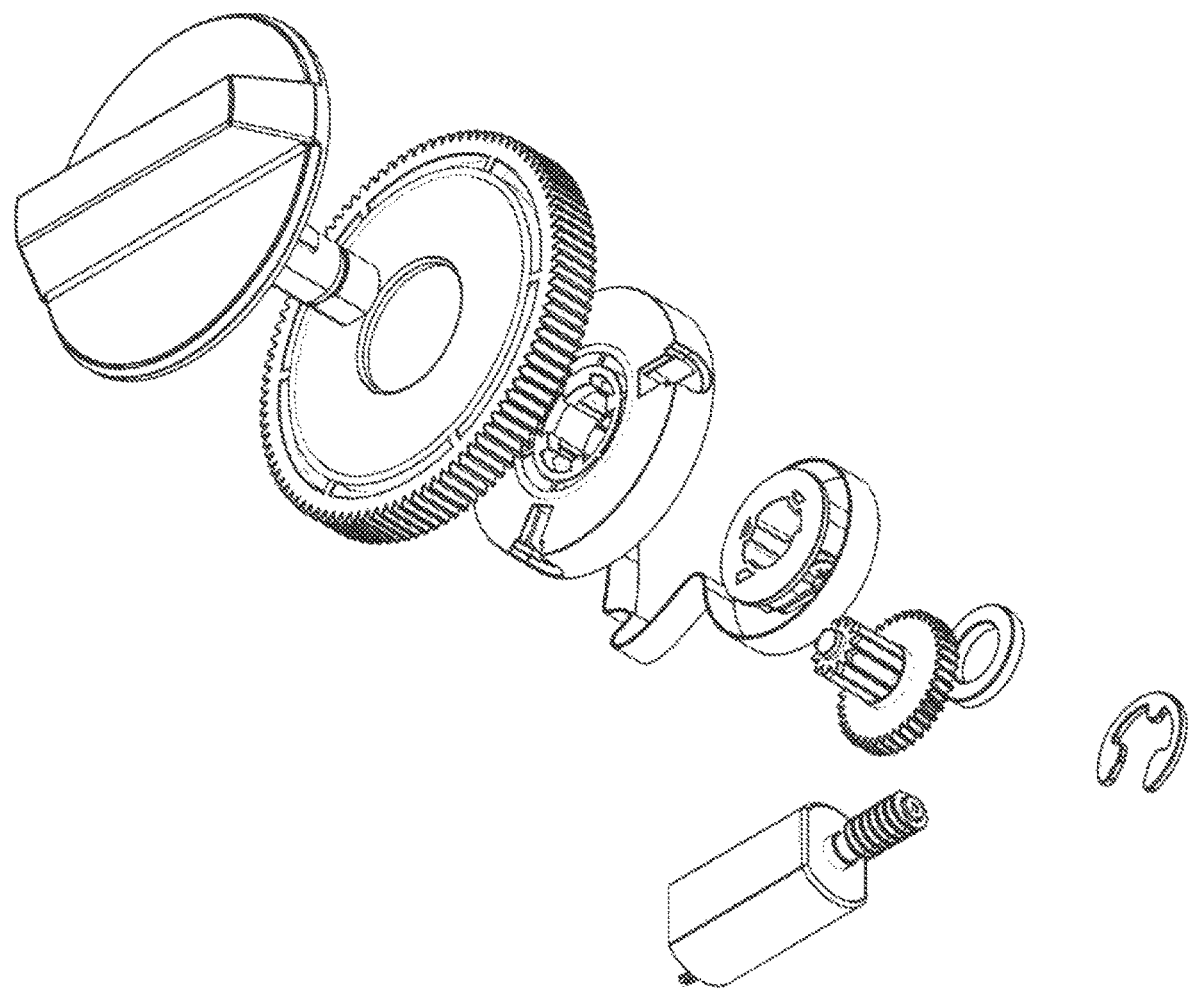
FIG. 13 is another view of the gear assembly of the smart lock according to an exemplary embodiment of the present invention.

FIGS. 12-13 illustrate a gear assembly 1200 of the smart lock 200 according to an exemplary embodiment of the present invention. As shown in FIGS. 12 and 13, the gear assembly 1200 may include the manual knob 420, a larger spur gear 1210 with detents 1212, a spring plunger 1220 and spring plunger holder 1222, the lock controller 780 and an accelerometer holder 1280, a washer 1230 and e-clip 1240, a motor 1260 with a worm gear 1262 and a smaller spur gear 1270. The larger spur gear 1210, the washer 1230, the worm gear 1262, and the smaller spur gear 1270 may be polytetrafluoroethylene (PTFE) for higher operation cycles and low noise. The larger spur gear 1210 and the smaller spur gear 1270 may be any size, provided the larger spur gear 1210 is larger than the smaller spur gear 1270. The motor 1260 may be a brushed direct current (DC) motor. As described above with reference to FIG. 7, lock controller 780 includes the accelerometer 782 (e.g., a 3-axis accelerometer), the deadbolt latch position sensor 784, and the motion interrupt 786. The lock controller 780 may be a flexible printed circuit board. The accelerometer 782 may be a microelectromechanical system (MEMS) accelerometer.

The gear assembly 1200 translates angular movement of the manual knob 420 into linear movement of the deadbolt latch 510, enabling the user to manually lock and unlock the deadbolt latch 510 by turning the manual knob 420. The motor 1260 and the gear assembly 1200 also enable the smart lock 200 to turn the manual knob 420 (and, by extension, extend the deadbolt latch 510) electronically.

The detent mechanism 1212 acts as a torque limiter between the knob 420 and the gears 1210 and 1270. The detent mechanism 1212 engages the knob 420 with the motor 1260 when lock/unlock has to be performed electronically and disengages the motor 1260 when the knob 420 is performing a manual lock or unlock operation. Disengaging the motor 1260 when the knob 420 is performing a manual lock or unlock operation improves the life of the motor 1260 and gear assembly 1200 by avoiding strain on the motor 1260 and the gears when a manual lock or unlock operation is being performed.

The accelerometer 782 detects movements to the manual knob 420 (and, by extension, the deadbolt latch 510). The knob position monitor 784 monitors the position of the manual knob 420 (and, by extension, the deadbolt latch 510). The movements detected by the accelerometer 782 and/or knob position monitor 784 are also used to form a close loop when electronically moving the manual knob 420 and locking or unlocking the locking or unlocking deadbolt latch 510, enabling the smart lock 200 to detect a stall condition (for example, if the motor 1260 is driving the manual knob 420 and the deadbolt latch 510 but the accelerometer 782 does not detect any acceleration or the knob position monitor 784 not detect any change in position). In the event of a stall condition, the smart lock 200 disengages the motor 1260 to prevent damage to the motor 1260 due to overcurrent. Accordingly, the gear assembly 1200 enables the smart lock 200 to reliably lock and unlock the deadbolt latch 510 electronically, detect a stall condition, and avoid damage to the motor 1260.

The outer unit 300 may be 7.48 inches (190 millimeters) in length, 2.91 inches (74 millimeters) in width, and 0.94 inches (24 millimeters) in depth. The inner unit 200 may be 7.48 inches (190 millimeters) in length, 2.99 inches (76 millimeters) in width, and 1.41 inches (36 millimeters) in depth. The battery pack 600 may be, for example, 2.75 inches (70 millimeters) wide, 2.48 inches (63 millimeters) long, and 0.85 inches (21.6 millimeters) tall. The lock device material may be zinc die cast acrylonitrile butadiene styrene (ABS) plastic. The enclosure of the outer unit 300 may have certified international protection (IP) rating of IP65. The enclosure of the inner unit 200 may be IP61. The video may have an H264 compression. The video may have a bitrate of 2048 kilobits per second (Kbps), 1024 Kbps, 512 Kbps, 128 Kbps, etc. The video may have a resolution of FHD1080P, HD720P, video graphics array (VGA), etc. The video may have a frame rate of 24 frames per second (fps), 20 fps, 15 fps, 5 fps etc. The night vision may be 950 nanometer (nm) active infrared (IR). The audio may be compressed using pulse code modulation (PCM), linear pulse code modulation (LPCM), mu-law scaled pulse code modulation (PCMU), etc. The audio may have a sample rate of 44 kilohertz (KHz), 32 KHz, 24 KHz, 16 KHz, 12 KHz, 11 KHz, 8 KHz, etc. The audio may have a resolution of 16-bit, 8-bit, etc. The local area network 130 may be 802.11b/g/n (2.4 GHz) Wi-Fi, 802.11a (5 GHz). The direct, short range, wireless communication may be Bluetooth 4.2. (BLUETOOTH is a registered trademark of Bluetooth SIG.)

The system and method of the present invention include operation by one or more processing devices, including user devices 120, server(s) 180, and a processing unit 720 of the smart lock device 200. A processing unit of a user device 120 may be any suitable device, such as a computer, processor, microprocessor, PC, tablet, smartphone, etc. A processing unit at the server(s) 180 may be a computer, server, processor, microprocessor, PC, tablet, smartphone, etc.; and the processing unit 720 at the smart lock 200 may be a processor, microprocessor, etc. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, WiFi, etc.). The information may be stored on a memory or storage device, which can be located at or in communication with the processing unit. Processes described above may be conducted automatically by the processing unit(s)—without any manual interaction by a user—using software. Accordingly, unless indicated otherwise, any process described above may occur substantially in real-time without any delays or manual action. Thus, as used herein, any processing unit may include or operate in combination with a medium, which includes one or more non-transitory physical media that together store the contents described as being stored thereon. Embodiments may include non-volatile secondary storage, read-only memory (ROM), and/or random-access memory (RAM). And an application includes one or more computing modules, programs, processes, workloads, threads and/or a set of computing instructions executed by a computing system. Example embodiments of an application include software modules, software objects, software instances and/or other types of executable code.

Within this specification, the various sizes, shapes and dimensions are approximate and exemplary to illustrate the scope of the invention and are not limiting. The sizes and the terms "substantially" and "about" mean plus or minus 15-20 percent, or in other embodiments plus or minus 10 percent, and in other embodiments plus or minus 5 percent, and in other embodiments plus or minus 1-2 percent. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

What is claimed is:

1. A smart lock system, comprising:
    a software application for a user device;
    a smart lock, comprising:
        a deadbolt latch configured to lock and unlock a door;
        a knob configured to manually extends and retracts the deadbolt latch;
        a motor and a gear unit configured to disengage the motor when the knob is manually extending or retracting the deadbolt latch and engage the motor to enable the smart lock to electronically extend and tract the deadbolt latch;
        an accelerometer configured to detect acceleration of the deadbolt latch or a position monitor configured to detect a position of the deadbolt latch; and
        an application process configured to:
            detect a stall condition in response to a determination that the motor is driving the deadbolt latch and either the accelerometer does not detect acceleration of the deadbolt latch or the position monitor does not output a change in the position of the deadbolt latch; and
            cause the detent mechanism to disengage the motor in response to the detection os a stall condition; and
    a server that:
        communicates with the smart lock via the internet; and
        outputs a command to the smart lock, in response to an instruction received from the software application of the user device via the internet, that causes the smart lock to lock or unlock the door.

2. The system of claim 1, wherein the software application is further configured to cause the user device to wirelessly and directly transmit an instruction to the smart lock that causes the smart lock to electronically lock or unlock the door.

3. The system of claim 2, wherein the software application is configured to cause the user device to simultaneously output both the instruction to the server via the internet and the direct wireless instruction to the smart lock.

4. The system of claim 2, wherein the software application is further configured to cause the user device to automatically, wirelessly, and directly transmit an instruction to the smart lock that causes the smart lock to unlock the door in response to a determination that the user device is within a predefined geofenced region around the smart lock.

5. The system of claim 1, wherein:
    the smart lock comprises a keypad; and
    the smart lock is configured to electronically unlock a door in response to a determination that a user has input a preset digital key via the keypad.

6. The system of claim 5, wherein:
    the software application provides functionality for a user to specify the preset digital key;
    the user device uploads the preset digital key specified by the user to the server;
    the server outputs the preset digital key specified by the user for transmittal to the smart lock via the internet; and
    the smart lock comprises a storage medium for storing the preset digital key specified by the user.

7. The system of claim 5, wherein:
    the software application provides functionality for a user to establish a guest account with a preset guest digital key; and
    the smart lock is configured to electronically unlock the door in response to a determination that the preset guest digital key has been input via the keypad during a time period specified by the user via the software application.

8. The system of claim 1, wherein:
    the smart lock comprises a camera configured to capture images;
    the smart lock transmits the images captured by the camera to the server via the internet; and
    the server transmits the images captured by the camera to the user device for display to the user via the software application.

9. The system of claim 8, wherein:
    the smart lock further comprises a ring button;
    the smart lock outputs an instruction to the server to output a notification the user device in response to a determination that the ring button has been pressed;
    the server provides functionality for the user device to display the images captured by the camera via the software application.

10. The system of claim 8, wherein:

the smart lock further comprises a motion sensor;

the smart lock transmits images captured by the camera to the server via the internet in response to motion detected by the motion sensor; and the server provides functionality for the user device to display the images captured by the camera via the software application.

11. A smart lock, comprising:

a deadbolt latch configured to lock and unlock a door;

a knob configured to manually extend and retract the deadbolt latch;

a motor and a gear unit configured to extend and retract the deadbolt latch;

a detent mechanism configured to disengage the motor when the knob is manually extending or retracting the deadbolt latch and engafe the motor to enable the smart lock to electronically extend and tract the deadbolt latch;

an accelerometer configured to detect acceleration of the deadbolt latch or a position monitor configured to detect a position of a deadbolt latch;

a networking processing unit configured to communicate with a server via the internet; and an application processing unit configured to:

electronically control the motor to extend or retract the deadbolt latch in response to a command received from the server via the internet, wherein the server outputs the command in response to an instruction received from a user device via the internet;

detect a stall condition in response to a determination that the motor is driving the deadbolt latch and either the accelerometer does not detect acceleration of the deadbolt latch or the position monitor does not output a change in the position of the deadbolt latch; and cause the detent mechanism to disengage the motor in response to the detection of a stall condition.

12. The smart lock of claim 11, wherein:

the networking processing unit is further configured to communicate with the user device wirelessly and directly; and the application processing unit is further configured to electronically control the motor to extend or retract the deadbolt latch in response to an instruction.

13. The smart lock of claim 12, wherein the user device simultaneously outputs both the instruction to the server via the internet and the direct wireless instruction to the smart lock.

14. The smart lock of claim 12, wherein the user device to automatically, wirelessly, and directly transmits an instruction to the smart lock that causes the application processing unit to electronically control the motor to retract the deadbolt latch in response to a determination that the user device is within a predefined geofenced region around the smart lock.

15. The smart lock of claim 11, further comprising:

a keypad; and a storage medium for storing a preset digital key, wherein the application processing unit is further configured to electronically control the motor to retract the deadbolt latch in response to a determination that a user has input the preset digital key via the keypad.

16. The smart lock of claim 15, wherein:

the server provides functionality for a user to specify the preset digital key; and the server outputs the preset digital key specified by the user for transmittal to the smart lock via the internet.

17. The smart lock of claim 15, wherein:

the server provides functionality for a user to:

establish a guest account with a preset guest digital key; and specify a time period during which the preset guest digital key unlocks the door; and the application processing unit is further configured to electronically control the motor to retract the deadbolt latch in response to a determination that preset guest digital key has been input via the keypad during the specified time period.

18. The smart lock of claim 11, further comprising:

a camera configured to capture images, wherein the smart lock transmits the images captured by the camera to the server via the internet.

19. The smart lock of claim 18, further comprising:

a ring button, wherein the smart lock outputs an instruction to the server to output a notification the user device in response to a determination that the ring button has been pressed.

20. The smart lock of claim 18, further comprising:

a motion sensor, wherein the smart lock transmits images captured by the camera to the server via the internet in response to motion detected by the motion sensor.

* * * * *